US006332118B1

(12) United States Patent
Yamabana

(10) Patent No.: US 6,332,118 B1
(45) Date of Patent: Dec. 18, 2001

(54) CHART PARSING METHOD AND SYSTEM FOR NATURAL LANGUAGE SENTENCES BASED ON DEPENDENCY GRAMMARS

(75) Inventor: Kiyoshi Yamabana, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/373,553

(22) Filed: Aug. 13, 1999

(30) Foreign Application Priority Data

Aug. 13, 1998 (JP) .................................... 10-228850

(51) Int. Cl.$^7$ ..................................................... G06F 17/27
(52) U.S. Cl. ........................................................... 704/9
(58) Field of Search ............................ 704/1, 9, 10, 255, 704/257; 707/530, 531

(56) References Cited

U.S. PATENT DOCUMENTS

| 5,060,155 | * | 10/1991 | Van Zuijlen | 704/9 |
| 5,761,631 | * | 6/1998 | Nasakawa | 704/9 |
| 5,960,384 | * | 9/1999 | Brash | 704/9 |
| 6,081,775 | * | 6/2000 | Dolan | 704/10 |
| 6,112,168 | * | 8/2000 | Corston et al. | 704/9 |
| 6,138,085 | * | 10/2000 | Richardson et al. | 704/9 |

FOREIGN PATENT DOCUMENTS

| 2-300970 | 12/1990 | (JP) | G06F/15/38 |
| 7-89353 | 9/1995 | (JP) | G06F/17/27 |
| 2546245 | 8/1996 | (JP) | G06F/17/28 |

OTHER PUBLICATIONS

Tennat, Arry, "Case Stusy: The Chart Parser", Natural Language Processing, Petrocelli book, New–york/Princeton, 1981, pp. 75–101.*

"Dependency Grammar Based on Strength of Modification Relation—Restrictive Grammar," Journal of the Information Processing Society, vol. 33, No. 10, pp. 1211–1223 (1992).

Collins, M.J., "A New Statistical Parser Based on Bigram Lexical Dependencies," Proceedings of the 34th Annual Meeting of the Association for Computational Linguistics (1996).

Eisner, J., "Bilexical Grammars and a Cubic–time Probabilistic Parser," Proceedings of the International Workshop on Parsing Technologies, MIT (1997).

Nomura, H., "Fundamentals of Natural Language Processing," The Institute of Electronics, Information and Communication Engineers, Chapter 2, Section 3 (1988).

* cited by examiner

Primary Examiner—Patrick N. Edouard
(74) Attorney, Agent, or Firm—Foley & Lardner

(57) ABSTRACT

A natural language processing system is disclosed. Upon inputting of a string of words to be analyzed, the natural language processing system generates an initial first chart in which locations between the words included in the input string of words are nodes while the words are edges and an initial second chart containing no edges and in which the words included in the input string of words are nodes, and stores the initial first and second charts in a memory. Then, applying pre-stored rules of a dependency grammar to an adjacent pair of edges on the first chart stored in the memory and an adjacent pair of edges on the second chart, the natural language processing system creates a dependency structure connecting the adjacent pair of edges on the first chart and a dependency structure connecting the adjacent pair of edges on the second chart, and stores the created dependency structures in the memory as new edges to be retained in the first and second charts. The natural language analyzing system repeats creation of the dependency structures and storage of the new edges until all edges contained in the first chart have been processed as target edges. When this condition for terminating the creation and storage is satisfied, the natural language analyzing system outputs the edges contained in the first chart as a result of analysis.

20 Claims, 32 Drawing Sheets

FIG. 12

| LEFT | RIGHT | DIRECTION | RESTRICTION |
|------|-------|-----------|-------------|
| W1 | W3 | → | · GRAMMAR APPLICATION TERMINATES WHEN W1 IS CHILD NODE OF W3 (ESPECIALLY IN CASE WHERE W3 ALREADY HAS ITS PARENT NODE)<br>· GRAMMAR APPLICATION TO W2 HAS BEEN FINISHED |
| W1 | W3 | ← | · GRAMMAR APPLICATION TERMINATES WHEN W1 IS PARENT NODE OF W3<br>· GRAMMAR APPLICATION TO W2 HAS BEEN FINISHED |
| W1 | W4 | → | · GRAMMAR APPLICATION TO W2 HAS BEEN FINISHED<br>· GRAMMAR APPLICATION TO W3 HAS BEEN FINISHED |
| W1 | W4 | ← | · GRAMMAR APPLICATION TO W3 HAS BEEN FINISHED<br>· GRAMMAR APPLICATION TO W2 HAS BEEN FINISHED |
| W2 | W3 | → | · GRAMMAR APPLICATION TERMINATES WHEN W3 IS PARENT NODE OF W2<br>· GRAMMAR APPLICATION TERMINATES WHEN W2 IS CHILD NODE OF W3 |
| W2 | W3 | ← | · GRAMMAR APPLICATION TERMINATES WHEN W2 IS PARENT NODE OF W3<br>· GRAMMAR APPLICATION TERMINATES WHEN W3 IS CHILD NODE OF W2 |
| W2 | W4 | → | · GRAMMAR APPLICATION TERMINATES WHEN W4 IS PARENT NODE OF W2<br>· GRAMMAR APPLICATION TO W3 HAS BEEN FINISHED |
| W2 | W4 | ← | · GRAMMAR APPLICATION TERMINATES WHEN W4 IS CHILD NODE OF W2<br>· GRAMMAR APPLICATION TO W3 HAS BEEN FINISHED |

61d

FIG. 17A
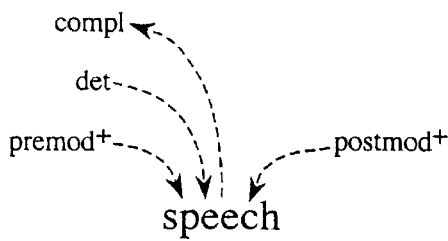
FIG. 17B
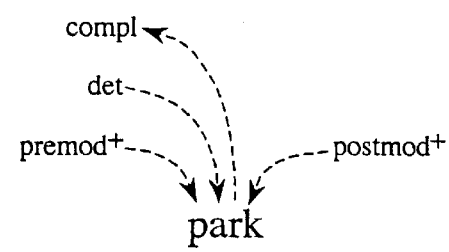
FIG. 17C
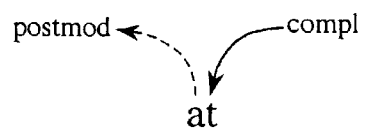
FIG. 17D
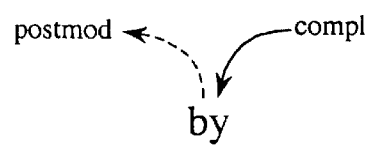
FIG. 17E
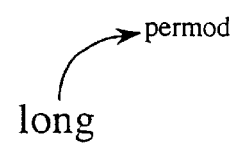
FIG. 17F
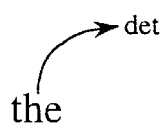
FIG. 17G
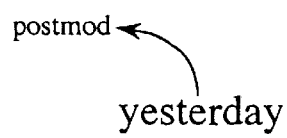
FIG. 18
by the long speech yesterday at the park

FIG. 22
• • • • • • • •
by  the  long  speech  yesterday  at  the  park
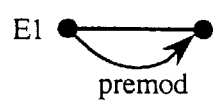
FIG. 23
by  the  long  speech  yesterday  at  the  park
•—•—•—•—•—•—•—•—•
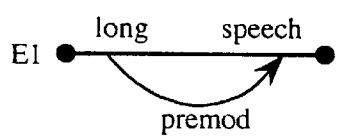
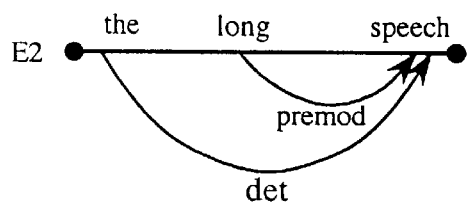
FIG. 24
• • • • • • • •
by  the  long  speech  yesterday  at  the  park
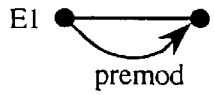
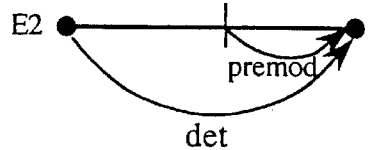

FIG. 35
PRIOR ART

```
1  for i:= 1 to n
2    foreach w_i ∈ W_i w_{i+1} ∈ W_{i+1} such that w_i w_{i+1} is not an excluded bigram, where W_{i+1} = {root}
3      foreach linktype ∈ ({←,→}×M) U [NONE]
4        Discover (i, i+1, (linktype w_i, w_{i+1}))                    (" seed with two-word spans ")
5  for width = 3 to n+1
6    for start = 1 to (n+1) - width
7      end = start + width
8      for mid = start + 1 to end - 1
9        foreach partial analysis a in C_{start, mid}                  ("i. e. a is each C_{start, mid} [s] that is defined ")
10         if sig(a). simple ?        (" where sig(a) is just s from comment above ; don't recompute it ")
11           for each partial analysis b in C_{mid, end} such that sig(b). w_L = sig(a). w_R
                            (" so a, b agree on sense of overlapping word ")
12             if (sig(a). R ? or sig(b). L ?) (" overlapping word gets exactly one parent ")
13               Discover (start, end, (NONE, a, b)) (" version without a covering link ")
14             if not (sig(a). L ? or sig(b). R ?) (" prevents multiple parents, link cycles ")
15               foreach link type ∈ ({←,→}×M)
16                 Discover (start, end, (linktype, a, b))
17 foreach partial analysis a in C_{0,n+1}
18   if sig(a). L ?  (" so a is a connected tree rooted at ROOT ")
19     then print a
```

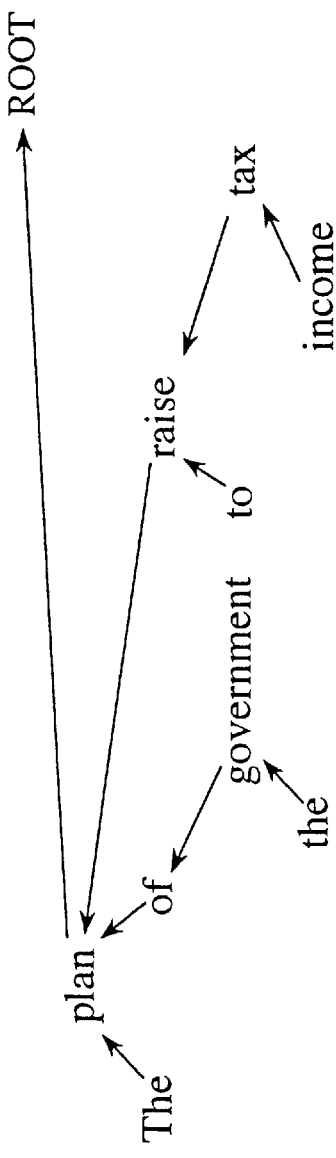
FIG. 36A
PRIOR ART
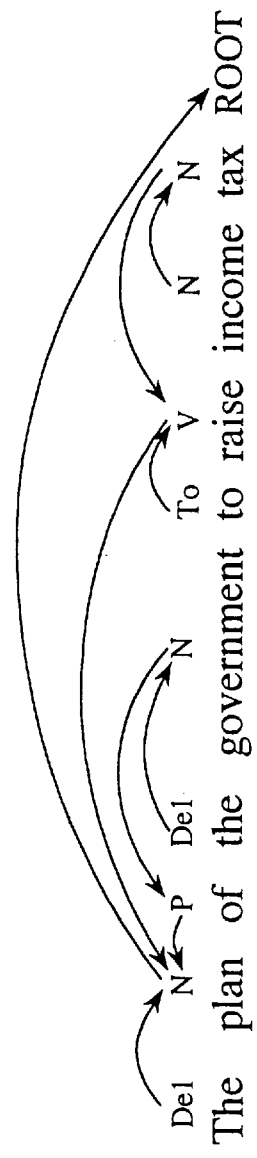
FIG. 36B
PRIOR ART
FIG. 36C
PRIOR ART
FIG. 36D
PRIOR ART
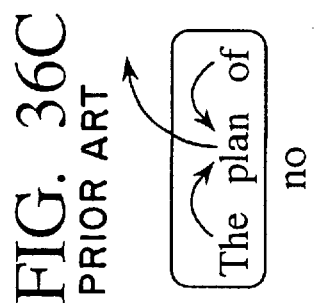
FIG. 36E
PRIOR ART

CHART PARSING METHOD AND SYSTEM FOR NATURAL LANGUAGE SENTENCES BASED ON DEPENDENCY GRAMMARS

BACKGROUND OF THE INVENTION

1. Field of the Invention

The present invention relates to a technique for analyzing natural language by applying a dependency grammar.

2. Description of the Related Art

A dependency grammar is a grammar which describes a syntax structure, defining a modification relation between two words and its type as basic elements. Available as a publication which discloses a method for analyzing natural language by applying the dependency grammar is "Dependency Grammar Based on Strength of Modification Relation—Restrictive Grammar" (which will be hereinafter referred to as "Publication 1") on the Journal of the Information Processing Society, vol. 33, no. 10, pp. 1211–1223. According to the method described in Publication 1, all possible solutions are attained by effecting a bottom-up depth-first analysis, while writing all possible dependency relations between two clauses into an analysis table, or a chart.

Available as a publication which discloses a method for attaining all possible solutions by performing a bottom-up depth-first analysis is "A New Statistical Parser Based on Bigram Lexical Dependencies" (which will be hereinafter referred to as "Publication 2") in the Proceedings of the 34th Annual Meeting of the Association for Computational Linguistics, July 1996. According to the method described in Publication 2, especially in Chapter 3 thereof, a bottom-up chart system is employed as an analyzing algorithm. Of two local analyzing result, priority is given to one having a higher possibility of usage, and the other having a lower possibility of usage is dismissed. The method described in Publication 2 employs the structure which writing words into a chart in a unit of dependency relations connective (that is, the dependency relation connective words having possibility to have linguistic meanings) words in which grammatical rule applied to words except a head word is completed.

Available as a publication which discloses another bottom-up chart system like Publication 2 is "Bilexical Grammars And A Cubic-Time Probabilistic Parser" (which will be hereinafter referred to as "Publication 3") in Proceedings of the International Workshop on Parsing Technologies, MIT, September 1997. The differences between Publication 2 and Publication 3 is a unit to be written into a chart. The method described in Publication 3 employs non-connective (that is, local analysis result to which linguistic meanings is hardly given) aligned result of local analysis in general as the unit of chart writing instead of local analysis result in which application of the grammatical rule is completed. According to this structure, the method of Publication 3 realizes a solution for limiting words at ends in a section to which further grammatical rule should be applied.

Giving priority to meanings for extracting meaning having the highest priority is a general method for clarifying vague meanings contained in natural language. It is difficult to compare priorities of meanings analyzed by the depth-first analysis like the technique disclosed in Publication 1 because the depth-first analysis is the time series analysis. The depth-first analysis also has difficulties for reusing the local analysis result for further analysis. According to those disadvantages, breadth-first analysis like techniques described in Publications 2 or 3 are often used for analyzing the natural language.

It is known a chart method which helps the breadth-first analysis. Available as a publication which discloses algorithm for the chart method is "Fundamentals of Natural Language Processing" written by Hirosato Nomura, published by The Institute of Electronics, Information and Communication Engineers, 1988, Chapter 2, Section 3 (which will be hereinafter referred to as "Publication 4"). The chart method features: controlling analysis order based on dynamic programming scheme; utilizing local analysis result registered in a chart; and classifying local analysis result having different internal structure but have the same grammatical function which will be shown at applying the grammatical rule carried out later, into the same group (this feature is so called "packing"). Because of those features, the chart method helps the breadth-first analysis to carry out an arbitral context-free grammar rule application with the calculation amount of an order of the 3rd power of the number of words in an input sentence.

Detailed explanation of the calculation amount of the chart method will now be described. Basically, the chart method groups local analysis results in adjacent sections into one. Construction analysis will proceed smoothly if the free-context grammar application employs the chart method, because applicability of the grammar rule to the local analysis result depends only on non-terminal symbols in the analysis result.

More precisely, further analysis will be simplified with using packages including local analysis result because word strings in a section can be packed into one regardless how complex structure they have, in a case where the word strings in one section are grouped in the same non-terminal symbol. Thus, the maximum number of the local analysis result in one section is a fixed number. The fixed number does not depend on the number of input words but the number of non-terminal symbols. Accordingly, the calculation amount per one basic calculation is also restricted by a fixed number uniformly. In this case, the maximum amount of calculation is an order of the 3rd power of the number of the words because the number of the basic calculations is equal to the number of combinations of adjacent two sections.

It is known that the maximum amount of calculation will be an order of the 5th power of the number of input words in a case where the chart method is simply applied to the dependency grammar. "apply" means applying grammar rule and packing with the dependency structure as a unit of edges. In this case, the dependency structure has grouped words in which a head word act as a parent word, and the grammar rule application to the words except the head word has been completed. This method is a directly extended method of analyzing context-free grammar using the chart method.

In the dependency grammatical rule, the state of the head word of a dependency structure determine which grammatical rule is applicable to the dependency structure later. However, it is generally unknown that which word in a section is a head word for the dependency structure of the analysis result regarding to the section concerned. Therefore, the maximum number of packed local analysis result in the section may be order of the number of the words in the section. As a result, the amount of calculation will be the 5th power of the number of the words.

To avoid this problem, the method described in Publication 3 employs generally non-connected structure in stead of employing the completed local structure including a head word acting as an edge i.e. a unit of words to be registered in a chart. The method determines the edges so that only a start word and an end word of the section determines grammatical function of the structure. Thus determined edges limits the number of functions (the number of cases) for further grammatical rule application to the analysis result in a section. In this case, the number of functions is a fixed number represented by the product of the number of states regarding to the grammatical rule applied to the start and end words of the section. This fixed number does not depend on the number of the words. As a result, the amount of calculation to obtain full result by the method of Publication 3 will also be an order of the 3rd power of the number of input words like the case of context-free grammatical rule application.

Analyzing method of Publication 3 will now be described with reference with a program list shown in FIG. 35. The program list shown in FIG. 35 is quoted from section 4.3 of Publication 3. In the program list, contents described in "(* . . . )" at line ends of lines 4, 9–14, and 18 represent comments.

A chart including words (nodes) is the basic data structure of the method described in Publication 3. The edges retain the start and end words, and words therebetween, that is, full information of the dependency relation among the nodes. The edges are defined and prepared so that nodes in the edges do not have dependency relation with nodes outside the edges, however, all nodes in the edges are not connected under the dependency relation.

Context analysis by this method will now be described. In this method, the edge connecting adjacent nodes (words) is prepared first as an initial chart (see lines 1–4 of the algorithm). More precisely, the first step is selecting a pair of adjacent words (see line 2 of the algorithm). And then, an edge (i.e. simply grouped two nodes) are added to the chart by executing line 4 of the algorithm with the link type selected to "NONE" so as to be effective onto the pair of words. Then, nodes are grouped to have the dependency relation if the dependency relation between adjacent two words is established and the dependency relation is added to the chart as the edge between the nodes. This action is done by executing line 4 of the algorithm with the link type selected to "←xM" or "→xM".

After the initial chart is thus prepared, adjacent two edges are grouped by executing lines 5–16. This grouping action is repeatedly done by bottom-up method. Hereinafter, the left edge is referred to as an edge a, and the right edge is referred to as an edge b. A right end node (word) of the edge a and a left end node (word) of the edge b are the same words (common node), and those are combined with each other in the grouped edge.

In the common node, the dependency relation defined by the edge a and edge b is checked whether it has contradiction or not (line 11). Further, the common node is checked whether it has only one parent node (line 12). After it is discriminated that the dependency relation does not have any contradiction and the common node has only one parent node, a new edge c is prepared. The newly prepared edge c includes nodes from a left end node of the edge a to a right end node of the edge b. The sum-set of the dependency relations owned by the edge a and edge b is given to the newly prepared edge as its dependency relation (line 13). If another dependency relation between a left end node (a left end node of the edge a) and a right end node (a right end node of the edge b) is established, a new edge having thus established dependency relation is prepared and registered in the chart (line 16).

Those actions are repeated by the bottom-up method, and a full analysis result is obtained. In this method, the most suitable result is extracted from the obtained result and output (lines 18 and 19).

FIGS. 36A to 36I are quoted from "FIG. 1" of Publication 3, and schematically show primal steps of analyzing a sentence "The plan of the government to raise income tax". FIG. 36A shows the dependency structure to be output. Each arrow shown in FIG. 36A represents the direction from a child node to a parent node. FIGS. 36B to 36E show how the dependency structure shown in FIG. 36A is expressed in the chart.

Judgements represented by "yes" or "no" as shown in FIGS. 36C to 36E indicate which local dependency structures are allowed as the edge. For example, FIG. 36C shows the structure having a head node "plan" on which "The" and "of" sandwiching the head node are depended is prohibited to be the edge in accordance with the algorithm. Therefore, the judgement of this structure is "no". On the other hand, the structure shown in FIG. 36D includes two connecting parts "of the government" and "to rise". Such structure is allowable as the edge. The structure shown in FIG. 36E is also allowable on the same basis. Since those structures are allowed to be the edge, those have the judgement "yes".

Analyzing steps by this conventional technique are shown in FIGS. 37A to 37D. FIG. 37A shows a step of grouping an edge in which the edge "of the government to raise" and the edge "plan of" are grouped together with using "of" as an intermediate node. In FIG. 37A, the nodes (words) in the right edge are divided into two connecting parts in accordance with the dependency relation. During the grouping action, an edge having a dependency relation having "plan" as a head word is prepared between "plan" and "raise". Other edges having no dependency relations are also prepared, however, those are ignored because the edge having the dependency relation will be a correct edge eventually.

In this method, as shown in FIG. 37B, an edge of "raise income tax ROOT" is prepared by grouping the edge "raise income tax" and the edge "tax ROOT" are grouped together while setting the node (word) "tax" as an intermediate point. During this grouping action, no dependency relation between "ROOT" and "raise" is established. "ROOT" is a special word which will be a head word of the whole sentence eventually. This word is automatically added by the analyzing system. A further edge "plan of the government to raise income tax ROOT" is prepared by grouping the edge "plan of the government to raise" and the edge "raise income tax ROOT". During this grouping action, a dependency relation from "plan" to "ROOT" is established. Other edges having no dependency relations are also prepared, however, those are ignored because those will not be correct edges at final stage.

In a final step of this method, an edge "the plan of the government to raise income tax ROOT" is prepared by grouping the edge "plan of the government to raise income tax ROOT" and the edge "the plan", as shown in FIG. 37C. Thus prepared edge is output as the final correct edge as shown in FIG. 37D.

This method described in Publication 3 has a problem that linguistically unnatural structure must be used as a unit of the local analysis result. Such linguistically unnatural structure are, for example, shown in non-connective local structure. For example, in the step of preparing the initial edge based on the adjacent words, there is no the dependency relations among the words contained in the initial edges, therefore, the dependency structure of the initial edge is non-connected structure. In the initial edge preparation step, the adjacent words are merely grouped. It is difficult to give the structural interpretation to such group which is not the structure. The edges grow by repeated grouping actions. Since adjacent words are generally grouped separately, non-connective relations remain. As a result, the edge having non-connective dependency structure such as "of the government to raise" shown in FIG. 36D is prepared. If such non-connective relation was not allowed, the method could not prepare the initial edge. Therefore, the non-connective relation is substantially allowed.

As described so far, artificial unit of the edge, such as the non-connective relation, is employed in this method. More precisely, such unit is counter to linguistic intuition. This fact reveals the problems of the method, such as difficulties in giving linguistic interpretation to the edge, and in doing various operations with a unit of the local analysis result such as comprehending the local analysis result or giving priority to the structure. For example, priority may be given to the local analysis result for pruning during analysis, however, it unable to intuitively discriminate whether the structural interpretation of a group having two dependency structures such as "of the government to raise" is correct or not. This noncommittal interpretation makes it difficult to define a rule for investigating whether the structure is proper or not.

Not only Publications 1 to 4 explained above, but also the following patent applications disclose a natural language processing technique:

Unexamined Japanese Patent Application KOKAI Publication No. H2-330970 (hereinafter referred to as Publication 5) discloses a natural language construction analyzing system. A feature of the natural language construction analyzing system disclosed in Publication 5 comprises an edge information retaining means for storing all analyzed edge information so that arbitrary edge information can be referred to by any edge at an arbitrary point in time. That is, by virtue of the presence of the edge information retaining means, the information on an edge which is not always at hand can be referred. This realizes improved linguistic processing which can handle, for example, a relational particle in Japanese which influences other words variously.

Japanese Patent No. 2,546,245 (hereinafter referred to as Publication 6) discloses a method of generating natural language sentences utilizing coactive relation between translation and concept in order to select suitable meaning for the translation of predicative concept. In this case, given meaning of a sentence to be generated is based on the dependency structure established between concepts. The technique disclosed in Japanese Patent No. 2,546,245 is one of the examples of context analyzing/generating method using a chart relating to the dependency grammar rule.

Examined Japanese Patent Application KOKOKU Publication No. H7-89353 (hereinafter referred to as Publication 7) discloses a natural language analyzer which shows priority of the edge, which is a result of analyzed context tree, as vector. The analyzer can describe prior knowledge naturally, because it shows the priority of the edge as vector. This feature makes the analyzer possible to manage prior knowledge coordination easily, to introduce new prior knowledge easily, and to prune branches correctly and significantly.

None of those Publications 5 to 7 discloses technique for restricting huge amount of calculation (an order of the 5th power of the number of words when a chart analysis is applied to the dependency grammar rule).

SUMMARY OF THE INVENTION

It is an object of the present invention to realize natural language analysis in which a dependency grammar rule is applied while performing breadth-first analyses for natural language with less amount of the calculation with using only the connected structure which will be a local analysis result to be registered in charts.

To achieve the above object, a natural language analyzing system according to a first aspect of the present invention is a natural language analyzing system for analyzing natural language, comprising a processor which processes data by executing a program in accordance with input data, a memory connected to said processor and in which the program to be executed by said processor and data necessary for execution of the program are stored, an input device connected to said processor and which inputs data to said processor, and an output device which outputs data processed by said processor, wherein said memory contains
  a dictionary storing area which stores rules of a dependency grammar of the natural language,
  a chart storing area storing a first chart which retains a dependency structure as an edge in which words are connected with each other with connective dependency relation while regarding positions at intervals among the words in a word string to be analyzed as nodes, and a second chart which retains a dependency structure as an edge in which words are connected with each other with the connective dependency relation while regarding the words in the word string to be analyzed as the nodes;
  a grammar applying area which stores a program for creating a dependency structure connecting an adjacent pair of edges on said first chart and a dependency structure connecting an adjacent pair of edges on said second chart, by applying the rules of the dependency grammar stored in said dictionary storing area to the adjacent pair of edges on said first chart and the adjacent pair of edges on said second charts,
  an edge registering area which stores a program for storing, in said chart storing area, the dependency structures created by the program stored in said grammar applying area, as new edges to be retained in said first and second charts, and
  an analysis control area which stores a program for repeating creation of the dependency structures which is performed by the program stored in said grammar applying area and storage of the new edges which is performed by the program stored in said edge registering area, until a predetermined condition is satisfied;
said input device inputs the string of words to be analyzed;
said processor analyzes the string of words which has been input from said input device, by executing the program stored in said analysis control area and thereby sequentially executing the program stored in said edge registering area and the program stored in said grammar applying area until the predetermined condition is satisfied; and
said output device outputs, as a result of analysis of the string of words which has been input from said input device, the edges stored in said edge storing area when the predetermined condition has been satisfied.

In the above natural language analyzing system, when the string of words to be analyzed is input from said input device, the program stored in said edge registering area may generate an initial first chart in which the locations between the words included in the input string of words are nodes while the words are edges, generates an initial second chart containing no edges and in which the words included in the input string of words are nodes, and may store the initial first and second charts in said chart storing area.

In the above natural language analyzing system, the program stored in said analysis control area may determine a target edge among the edges retained in said first chart stored in said chart storing area and a target edge among the edges retained in said second chart stored in said chart storing area. In this case, said grammar applying area may store a first grammar applying program for generating a new edge by applying the rules of the dependency grammar stored in said dictionary storing area to the determined target edge and an adjacent edge on said first chart, and generating a new edge by applying rules of the dependency grammar stored in said dictionary storing area to the determined target edge and an adjacent edge on said second chart.

In the above natural language analyzing system, said memory may further contain a correspondence management area which manages correspondence between the first and second charts stored in said chart storing area. In this case, the program stored in said analysis control area may determine a target edge among the edges retained in said first chart stored in said chart storing area, based on a dynamic programming scheme, and determines an edge, which corresponds to the target edge in the first chart, managed by said correspondence management area as another target edge.

In the above natural language analyzing system, said first grammar applying program may check whether there is a dependency relation, conforming to the rules of the dependency grammar stored in said dictionary storing area, between the target edge determined on said first chart by the program stored in said analysis control area and an adjacent edge located on one of right and left sides of said target edge, and generates, out of said target edge and said adjacent edge, a new edge to be retained in said first chart when there is the dependency relation between said target edge and said adjacent edge.

Said second grammar applying program may check whether there is a dependency relation, conforming to the rules of the dependency grammar stored in said dictionary storing area, between the target edge determined on said second chart by the program stored in said analysis control area and an adjacent edge located on one of right and left sides of said target edge, and may generate, out of said target edge and said adjacent edge, a new edge to be retained in said second chart when there is the dependency relation between said target edge and said adjacent edge.

In the above natural language analyzing system, the predetermined condition for terminating the creation of the dependency structures performed by the program stored in said grammar applying area and the storage of the new edges performed by the program stored in said edge registering area may be, for example, that all edges retained in said first chart stored in said chart storing area have been processed as target edges.

In the above natural language analyzing system, said memory may further contain a morpheme analyzing area which stores a program for morphemically analyzing the string of words to be analyzed which has been input from said input device. In this case, said input device may input a sentence written in the natural language and containing the string of words to be analyzed; and said processor may morphemically analyze the sentence which has been input from said input device and divides the sentence into strings of words by executing the program stored in said morpheme analyzing area, and may generate, out of the divided strings of words, said initial first and second charts to be stored in said chart storing section.

In the above natural language analyzing system, said memory may further contain an analyzing result selecting area which stores a program for selecting edges to be output as the result of analysis, from among the edges stored in said edge storing area when the predetermined condition has been satisfied. In this case, said processor may execute the program stored in said analyzing result selecting section, thereby selecting the edges to be output as the result of analysis; and said output device may output, as the result of analysis, the edges which said processing unit has selected by executing the program stored in said analyzing result selecting area.

In the above natural language analyzing system, said chart storing area may store a single chart which has physically a single structure and which comprises logically two, first and second charts.

To achieve the above object, a natural language analyzing system according to a second aspect of the present invention is a natural language analyzing system for analyzing natural language, which comprises:

input means for inputting a string of words to be analyzed;

dictionary storing means for storing rules of dependency grammar of the natural language;

chart storing means for storing a first chart which retains a dependency structure as an edge in which words are connected with each other with connective dependency relation while regarding positions at intervals among the words in a word string to be analyzed as nodes, and a second chart which retains a dependency structure as an edge in which words are connected with each other with the connective dependency relation while regarding the words in the word string to be analyzed as the nodes;

grammar applying means for creating a dependency structure connecting an adjacent pair of edges on said first chart and a dependency structure connecting an adjacent pair of edges on said second chart, by applying the rules of the dependency grammar stored in said dictionary storing area to the adjacent pair of edges on said first chart and the adjacent pair of edges on said second charts;

edge registering means for storing, in said chart storing means, the dependency structures created by said grammar applying means as new edges;

analysis control means for controlling said grammar applying means to repeat creation of the dependency structures and controlling said edge registering means to repeat storage of the new edges until a predetermined condition is satisfied; and output means for outputting as a result of analysis the edges stored in said edge storing area, when the predetermined condition has been satisfied as a consequence of said analysis control means repeating the creation of the dependency structures and said edge registering means repeating the storage of the new edges.

In the above natural language analyzing system, when the string of words to be analyzed is input from said input means, said edge registering means may generate an initial first chart in which the locations between the words included in the input string of words are nodes while the words are edges, generate an initial second chart containing no edges and in which the words included in the input string of words are nodes, and store the initial first and second charts in said chart storing means.

In the above natural language analyzing system, said analysis control means may determine a target edge among the edges retained in said first chart stored in said chart storing means and a target edge among the edges retained in said second chart stored in said chart storing means. In this case, said grammar applying area may include means for generating a new edge by applying the rules of the dependency grammar stored in said dictionary storing area to the determined target edge and an adjacent edge on said first chart, and means for generating a new edge by applying rules of the dependency grammar stored in said dictionary storing area to the determined target edge and an adjacent edge on said second chart.

To achieve the above object, a natural language analyzing method according to a third aspect of the present invention is a natural language analyzing method for analyzing natural language, which comprises:

inputting a string of words to be analyzed;

generating, at a time of input of the string of words to be analyzed, an initial first chart in which the locations between the words included in the input string of words are nodes while the words are edges and an initial second chart containing no edges and in which the words included in the input string of words are nodes, and storing the initial first and second charts in a memory;

creating a dependency structure connecting an adjacent pair of edges on the first chart stored in the memory and an dependency structure connecting an adjacent pair of edges on the second chart stored in the memory, by applying pre-stored rules of a dependency grammar to the adjacent pair of edges on the first chart and the adjacent pair of edges on the second charts;

storing, in the memory, the created dependency structures as new edges to be retained in the first and second charts;

repeating said creating of the dependency structures and said storing of the new edges until a predetermined condition is satisfied; and outputting, as a result of analysis, the edges stored in the memory when the predetermined condition has been satisfied as a consequence of repeating the creation of the dependency structures and the storage of the new edges.

In the above natural language analyzing method, a target edge among the edges retained in said first chart stored in said memory and a target edge among the edges retained in said second chart stored in said memory may be determined until the predetermined condition is satisfied. In this case, said applying of the pre-stored rules may be performed by applying the pre-stored rules of the dependency grammar to the determined target edge and an adjacent edge on the first chart and by applying the pre-stored rules of the dependency grammar to the determined target edge and an adjacent edge on the second chart.

In the above natural language analyzing system, said inputting of the string of words to be analyzed may be performed by inputting a sentence written in the natural language and containing the string of words to be analyzed. In this case, said method may further comprise morphemically analyzing and dividing the input sentence into strings of words, after said step of inputting the string of words; and an initial first chart in which locations between words included in each of the divided strings of words are nodes while the words are edges, and an initial second chart containing no edges and in which the words included in each of the divided strings of words are nodes, may be generated as the initial first and second charts by said generating.

In the above natural language analyzing method may further comprises selecting edges to be output as the result of analysis from among the edges stored in the memory when the predetermined condition has been satisfied before said step of outputting the result of analysis. In this case, the selected edges are output by said outputting as the result of analysis.

In the above natural language analyzing system, the predetermined condition for terminating said creating of the dependency structures and said storing of the new edges may be, for example, that all edges retained in said first chart have been processed as target edges.

To achieve the above object, a computer program product according to a fourth aspect of the present invention includes a computer usable medium having a computer readable program embodied therein to execute:

a first edge registering step of generating, at a time of input of a string of words to be analyzed, an initial first chart in which locations between the words included in the input string of words are nodes while the words are edges and an initial second chart containing no edges and in which the words included in the input string of words are nodes, and storing the initial first and second charts in a memory;

a grammar applying step of creating a dependency structure connecting an adjacent pair of edges on the first chart stored in the memory and a dependency structure connecting an adjacent pair of edges on the second chart stored in said memory, by applying rules of a dependency grammar to the adjacent pair of edges on the first chart and the adjacent pair of edges on the second charts;

a second edge registering step of storing the dependency structures created by said grammar applying step in the memory as new edges to be retained in the first and second charts; and an analysis control step of repeating said creating of the dependency structures and said storing of the new edges until a predetermined condition is satisfied.

To achieve the above object, a program data signal embedded in a carrier wave according to a fifth aspect of the present invention, comprises:

a first edge registering segment of generating, at a time of input of a string of words to be analyzed, an initial first chart in which locations between the words included in the input string of words are nodes while the words are edges and an initial second chart containing no edges and in which the words included in the input string of words are nodes, and storing the initial first and second charts in a memory;

a grammar applying segment of creating a dependency structure connecting an adjacent pair of edges on the first chart stored in the memory and a dependency structure connecting an adjacent pair of edges on the second chart stored in the memory, by applying pre-stored rules of a dependency grammar to the adjacent pair of edges on the first chart and the adjacent pair of edges on the second charts;

a second edge registering segment of storing the dependency structures created by said grammar applying segment in the memory as new edges to be retained in the first and second charts; and an analysis control segment of repeating said creating of the dependency structures and said storing of the new edges until a predetermined condition is satisfied.

BRIEF DESCRIPTION OF THE DRAWINGS

These objects and other objects and advantages of the present invention will become more apparent upon reading of the following detailed description and the accompanying drawings in which:

FIG. 12 is a diagram exemplifying restriction conditions to be stored in a restrictive conditions storing section shown in FIG. 9;

FIGS. 17A to 17G are diagrams schematically showing the contents of an English dictionary shown in FIG. 5;

FIG. 18 is a diagram exemplifying an English sentence input by an input section shown in FIG. 5;

FIG. 22 is a diagram schematically showing an example of the second chart at intermediate stage;

FIG. 23 is a diagram schematically showing an example of the first chart at intermediate stage;

FIG. 24 is a diagram schematically showing an example of the second chart at intermediate stage;

FIG. 35 is a program list showing algorithm for processing natural language analyzing realized by a conventional technique;

FIG. 36A is a diagram schematically showing the dependency structure to be output according to the conventional technique;

FIGS. 36B to 36E are diagrams showing how the dependency structure shown in FIG. 36A is expressed on a chart.

DETAILED DESCRIPTION OF THE PREFERRED EMBODIMENT

Preferred embodiments of the present invention will now be described with reference to the accompanying drawings.

First Embodiment

Figure 1:
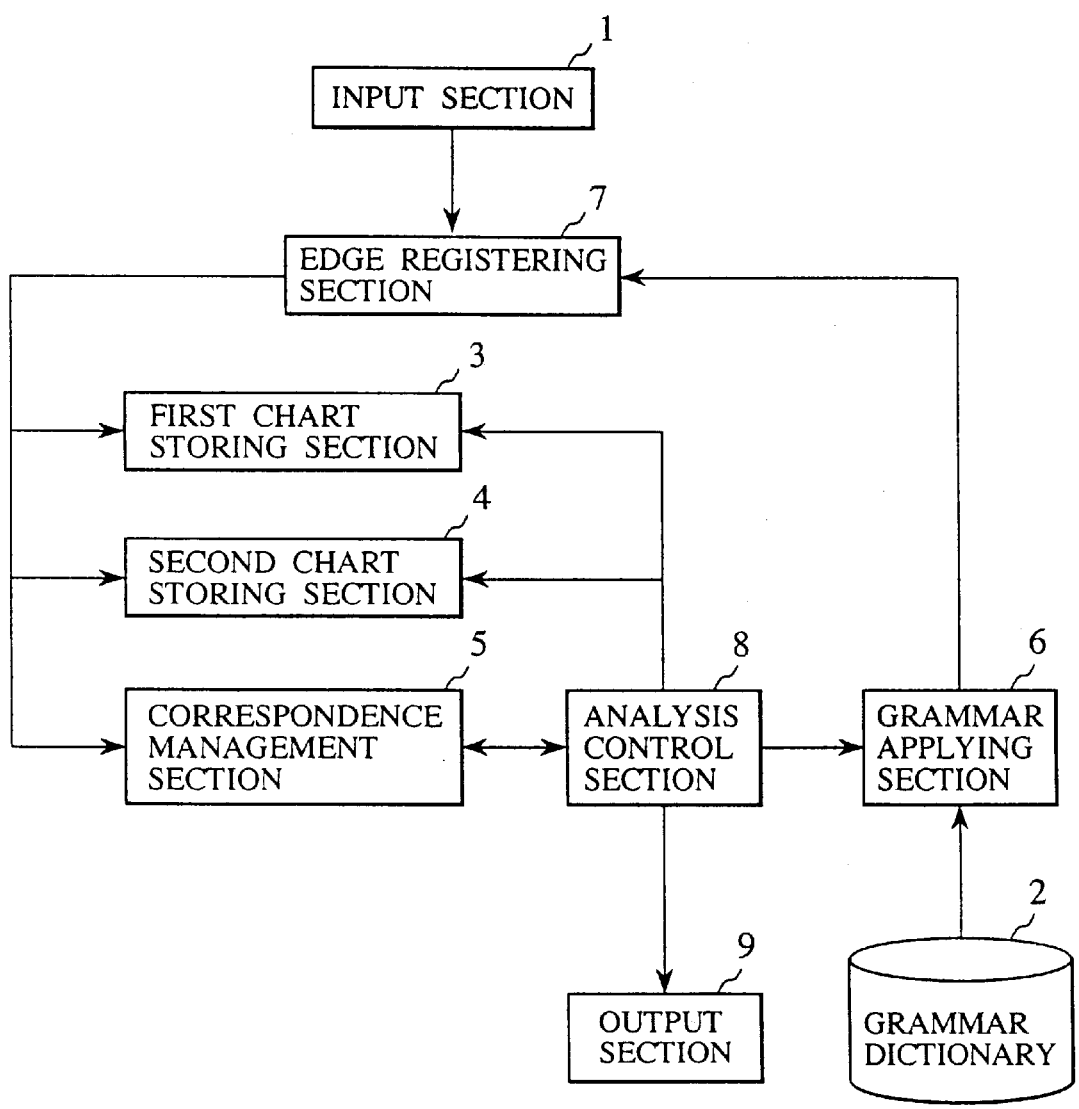
FIG. 1 is a block diagram showing the function structure of a natural language processing system according to a first embodiment of the present invention.

FIG. 1 is a block diagram showing the functional structure of a natural language processing system according to the first embodiment of the present invention. This natural language processing system has an input section 1, a grammar dictionary 2, a first chart storing section 3, a second chart storing section 4, a correspondence management section 5, a grammar applying section 6, an edge registering section 7, an analysis control section 8 and an output section 9.

The input section 1 is a section to which a string of words is input. The grammar dictionary 2 stores the rules of the dependency grammar of natural language to be analyzed. The first chart storing section 3 stores a first chart which retains edges. Each of the edges contains words and a connective local analysis result of dependency relation among the words while regarding positions of start and end words and interval positions among the words as nodes. The second chart storing section 4 stores a second chart. The second chart also retains edges, however, words themselves in the edges are regarded as nodes.

The correspondence management section 5 manages the correspondence between edges stored in the first chart and those stored in the second chart. The grammar applying section 6, to which a pair of edges located adjacent to each other on the first or second chart is input, produces a local analyzing result in which the edges have been connected together by the dependency relation.

When the string of words to be analyzed is input to the edge registering section 7 from the input section 1, the edge registering section 7 generates initial first and second charts which will be described later, and stores them in the first and second chart storing sections 3 and 4, respectively. The edge storing section 7 also registers, as edges, connective local analyzing result newly produced by the grammar applying section 6 in the first and second charts, and updates the contents of the correspondence management section 5. When registering the connective local analyzing result in the first and second charts, the edge registering section 7 subjects those analyzing result to packing if necessary.

The analysis control section 8 controls the order in which the rules of the dependency grammar are applied to the edges. When a predetermined requirement is satisfied, the output section 9 outputs an edge contained in the first chart stored in the first chart storing section 3, as the result of the analysis performed as to the string of words input from the input section 1.

Figure 2:
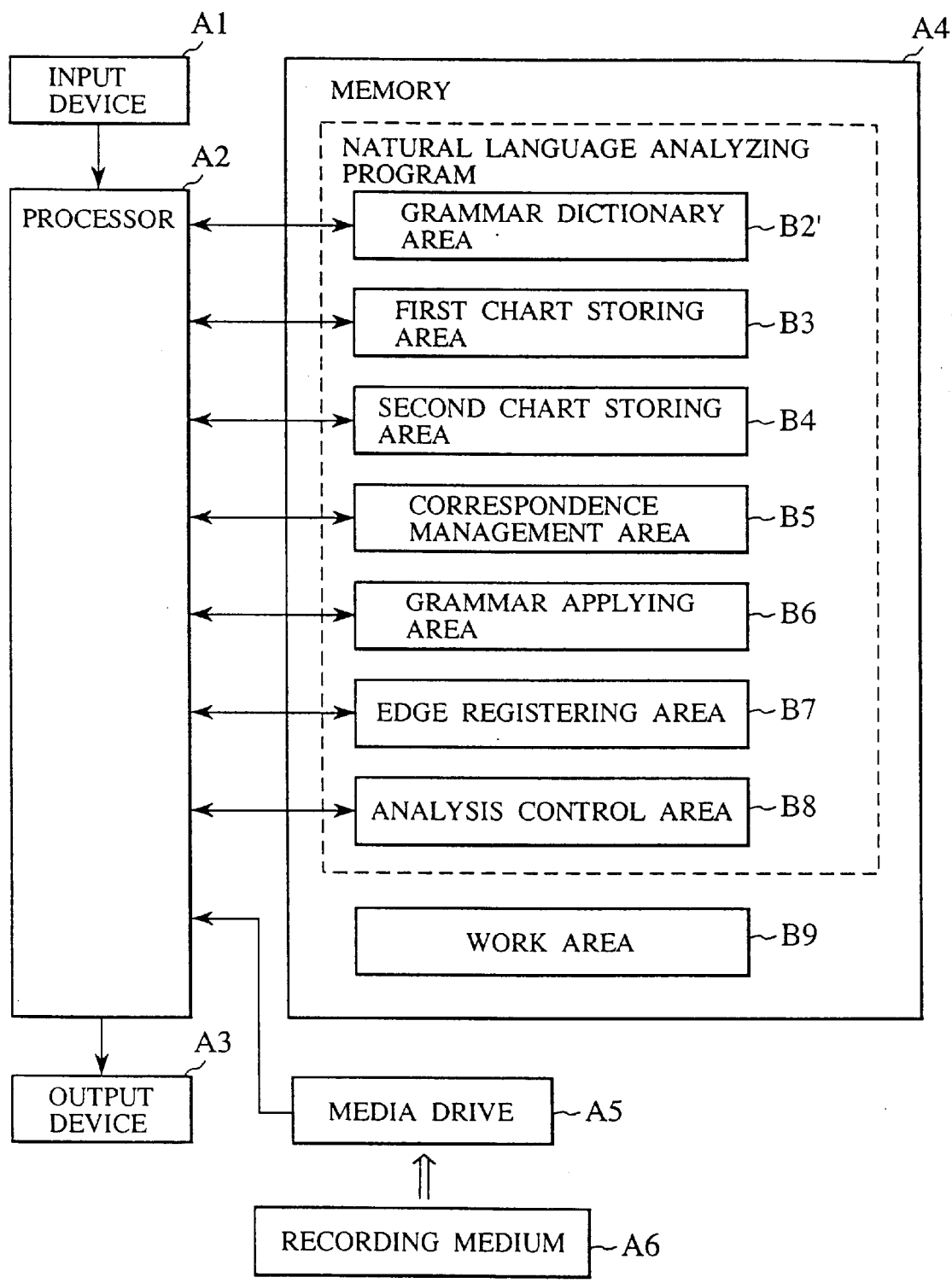
FIG. 2 is a block diagram showing the structure of a computer system which accomplishes the natural language processing system shown in FIG. 1.
Figure 3:
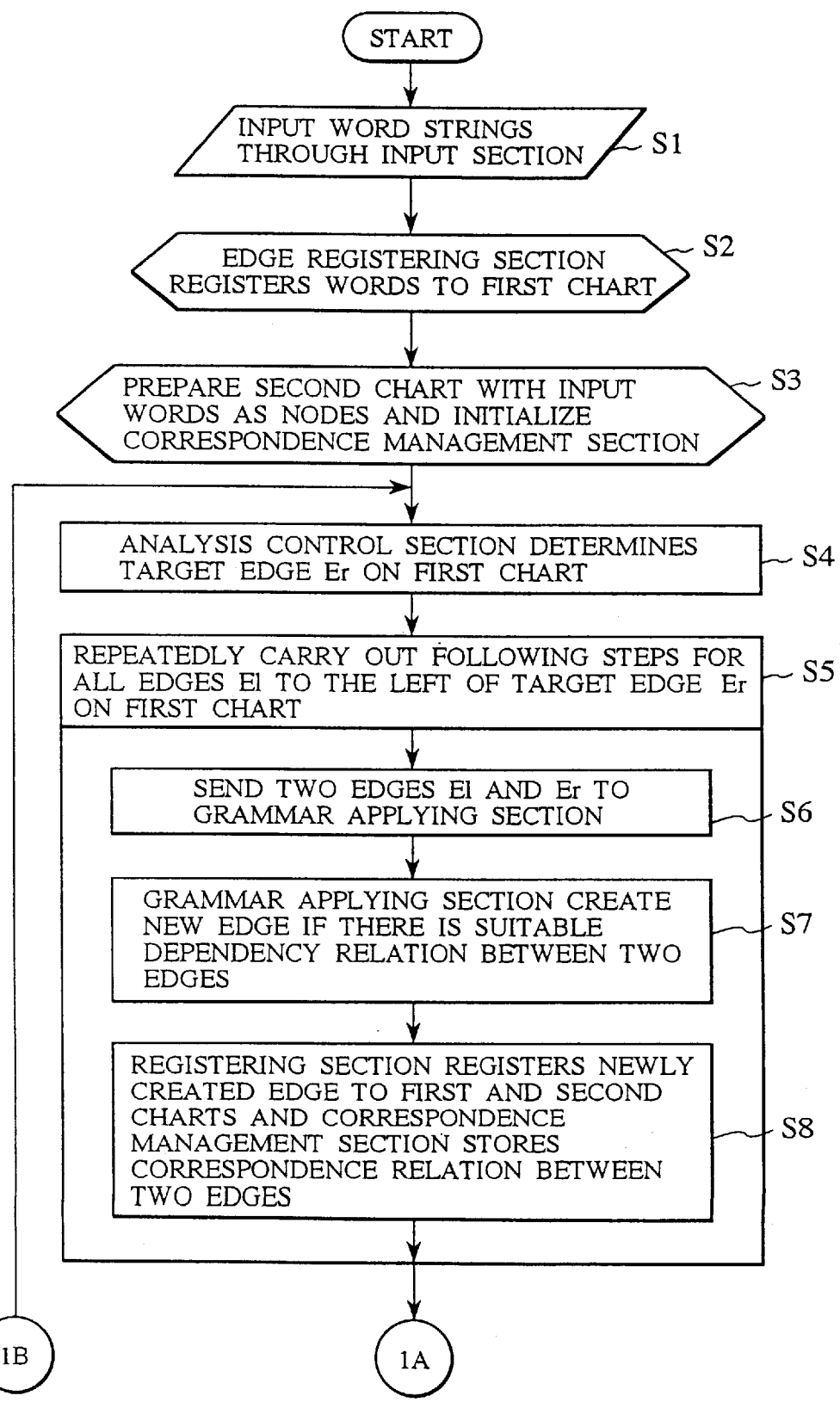
FIG. 3 is a flowchart showing the steps to be executed by the natural language processing system shown in FIG. 1.

FIG. 2 is a block diagram illustrating the structure of a computer system which realizes the natural language processing system illustrated in FIG. 1. This computer system has an input device A1, a processor A2, an output device A3, a memory device A4 and a medium driver A5. A storage medium A6 is detachably inserted in the medium driver A5.

The storage medium A6, which comprises a magnetic disk, a magnetic tape, an optical disk, a semiconductor memory or any other computer usable storage medium, stores a natural language processing program. The medium driver A5 reads out the natural language processing program from the storage medium A6 in accordance with an instruction from the processor A2, and loads the program into the memory device A4.

The memory device A4 has areas allotted thereto, i.e., a grammar dictionary area B2, a first chart storing area B3, a second chart storing area B4, a correspondence management area B5, a grammar applying area B6, an edge registering area B7 and an analysis control area B8. A work area B9 which the processor A2 uses to execute the program, is also provided in the memory device A4.

The grammar dictionary area B2 stores the grammar dictionary 2 shown in FIG. 1. The first chart storing area B3 stores the aforementioned first chart. The second chart storing area B4 stores the aforementioned second chart. The correspondence management area B5 stores and manages the correspondence between the first and second charts. The grammar applying area B6 stores any program for realizing the grammar applying section 6 shown in FIG. 1. The edge registering area B7 stores any program for realizing the edge registering section 7 shown in FIG. 1. The analysis control area B8 stores any program for realizing the analysis control section 9 shown in FIG. 1.

The processor A2 executes the programs stored in the correspondence management area B5, the grammar applying area B6, the edge registering area B7 and the analysis control area B7, and realizes the function of each of the correspondence management section 5, the grammar applying section 6, the edge registering section 7 and the analysis control section 8 shown in FIG. 1. The input device A1, which comprises a keyboard, etc., realizes the function of the input section 1 shown in FIG. 1, in cooperation with the processor A2. The output device A3, which comprises a display unit, etc., realizes the function of the output section 9 shown in FIG. 1, in cooperation with the processor A2.

Figure 4:
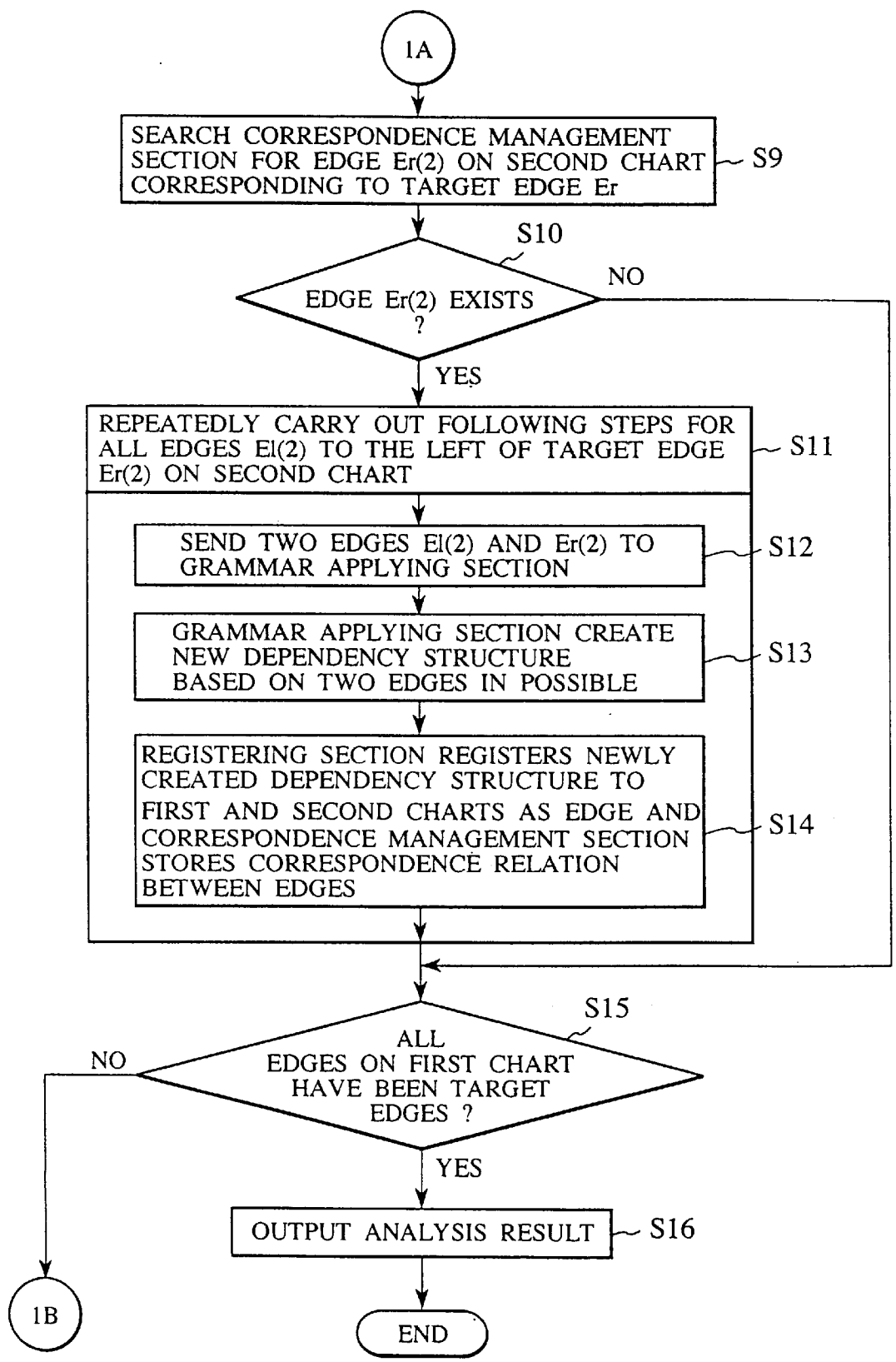
FIG. 4 is a flowchart showing the steps to be executed by the natural language processing system shown in FIG. 1.

The operation of the natural language analyzing system according to the first embodiment will now be explained with reference to the flowchart of FIG. 4. Explanations which will hereinafter be made in regard to the operation of the natural language analyzing system are based on the functional block diagram shown in FIG. 1.

The input section 1 inputs a to-be-analyzed string of words written in natural language (a step S1). The to-be-analyzed string of words which has been input from the input section 1 is sent to the edge registering section 7. The edge registering section 7 creates the initial first chart, with the locations of the beginning and end of the string of words received from the input section 1 and the locations between the words being nodes, after which the edge registering section 7 stores the created initial first chart in the first chart storing section 3 (a step S2). Next, the edge registering section 7 creates the initial second chart which contains no edges and stores the created second chart with the words being nodes in the second chart storing section 4. Furthermore, the edge registering section 7 initializes the correspondence management section 5 (a step S3).

After the initial first and second charts have been thus created, the analysis control section 8 is activated. The analysis control section 8 repeats the operations of determining a target edge on the first and second charts on the basis of a dynamic programming scheme and causing the grammar applying section 6 and the edge registering section 7 to connect the target edge and any edges adjacent thereto together. The processing controlled by the analysis control section 8 will be described below in detail:

The analysis control section 8 determines a target edge Er among the edges retained in the first chart (a step S4). Then, the analysis control section 8 sequentially determines, as an edge El, adjacent edges located on the left side of the target edge Er, and repeats steps S6 to S8 with respect to each of the determined edges (a step S5).

The analysis control section 8 sends the edge El and the target edge Er to the grammar applying section 6 (a step S6). With reference to dependency grammar rules stored in the grammar dictionary 2, the grammar applying section 6 checks whether the words located at both ends of the two edges El and Er can be connected with each other by the connective dependency relation. In the case where they can be connected with each other by the connective dependency relation, the grammar applying section 6 produces local analyzing result in which the words at the end nodes have been connected together by the connective dependency relation, and sends the produced result to the edge registering section 7 (a step S7).

Having received the local analyzing result from the grammar applying section 6, the edge registering section 7 registers the received result as edges in the first and second charts. The edge registering section 7 further registers, in the correspondence management section 5, the correspondence between the two edges registered in the first and second charts (a step S8). In the case where a word located at one end of the newly prepared edge coincide with a word located at one end of another edge which has been already registered in the charts, and the newly prepared edge and the registered edge have the same grammatical function, the edge registering section 7 packs the newly prepared edge with the registered edge so that it will be sufficient for the grammar applying section 6 to perform an application of the grammatical rule once in a later analyzing process, and registers the packed edges in the first or second chart.

Having finished the processing of the steps S5 to S8 with respect to the target edge Er determined by the step S4, the analysis control section 8 retrieves an edge Er (2) corresponding to the target edge Er from the correspondence management section 5. By determining whether the edge Er (2) could be retrieved from the correspondence management section 5, the analysis control section 8 determines whether the edge Er (2) is present on the second chart stored in the second chart storing section 4 (a step S10).

In the case where the analysis control section 8 determines that the edge Er (2) is present on the second chart, then the analysis control section 8 sequentially determines, as an edge El (2), adjacent edges located on the left side of the edge Er (2) retained in the second chart, and repeats the steps S6 to S8 with respect to each of the determined edges.

The analysis control section 8 sends the edge El (2) and the edge Er (2) to the grammar applying section 6 (a step S12). With reference to the dependency grammar rules stored in the grammar dictionary 2, the grammar applying section 6 checks whether the words located at both ends of each of the two edges El (2) and Er (2) can be connected with each other by the connective dependency relation. In the case where they can be connected with each other by the connective dependency relation, then the grammar applying section 6 produces local analyzing result in which the words located at both ends have been connected with each other by the connective dependency relation, and sends the produced result to the edge registering section 7 (a step S13).

Having received the local analyzing result from the grammar applying section 6, the edge registering section 7 registers the received result as edges in the first and second charts. The edge registering section 7 further registers, in the correspondence management section 5, the correspondence between the two edges registered in the first and second charts (a step S14). In the case where a word located at one end of the newly prepared edge coincide with a word located at one end of the edge which has been registered in the charts, and the newly prepared edge and the registered edge have the same grammatical function, the edge registering section 7 packs the newly prepared edge with the registered edge so that it will be sufficient for the grammar applying section 6 to perform applying the grammatical rule once in a later analyzing process, and registers the packed edges in the first or second chart. Then, the analysis control section 8 goes to a step S15.

On the other hand, in the case where the analysis control section 8 determines in the step S8 that the edge Er (2) is not present on the second chart, the analysis control section 8 goes to the step S15, skipping over steps S11 to S14.

In the step S15, the analysis control section 8 determines whether each of the edges contained in the first chart has been dealt with as the target edge. In the case where the analysis control section 8 determines that any edge remains without being dealt with as the target edge, then the analysis control section 8 goes back to the step S4 and again selects any remaining edge as the target edge. On the other hand, in the case the analysis control section 8 determines in the step S15 that each of the edges contained in the first chart has been dealt with as the target edge, the analysis control section 8 passes the edges contained in the first chart to the output section 9. The output section 9 outputs the edges passed from the analysis control section 8 as the result of the analysis performed as to the input string of words (a step S16), and terminates processing.

The natural language analyzing system of the first embodiment is capable of breadth-first analyzing the input string of words in accordance with a chart system adopting the dependency grammar, by performing calculations of an amount on the order of the third power of the number of words. Besides, the local analyzing result (edges) stored in the charts are limited to those of the words connected with each other by the connective dependency relation. This facilitates a variety of language processing (e.g. giving priority to the local analyzing result) which the natural language analyzing system of the first embodiment performs with respect to the local analyzing result.

Second Embodiment

Figure 5:
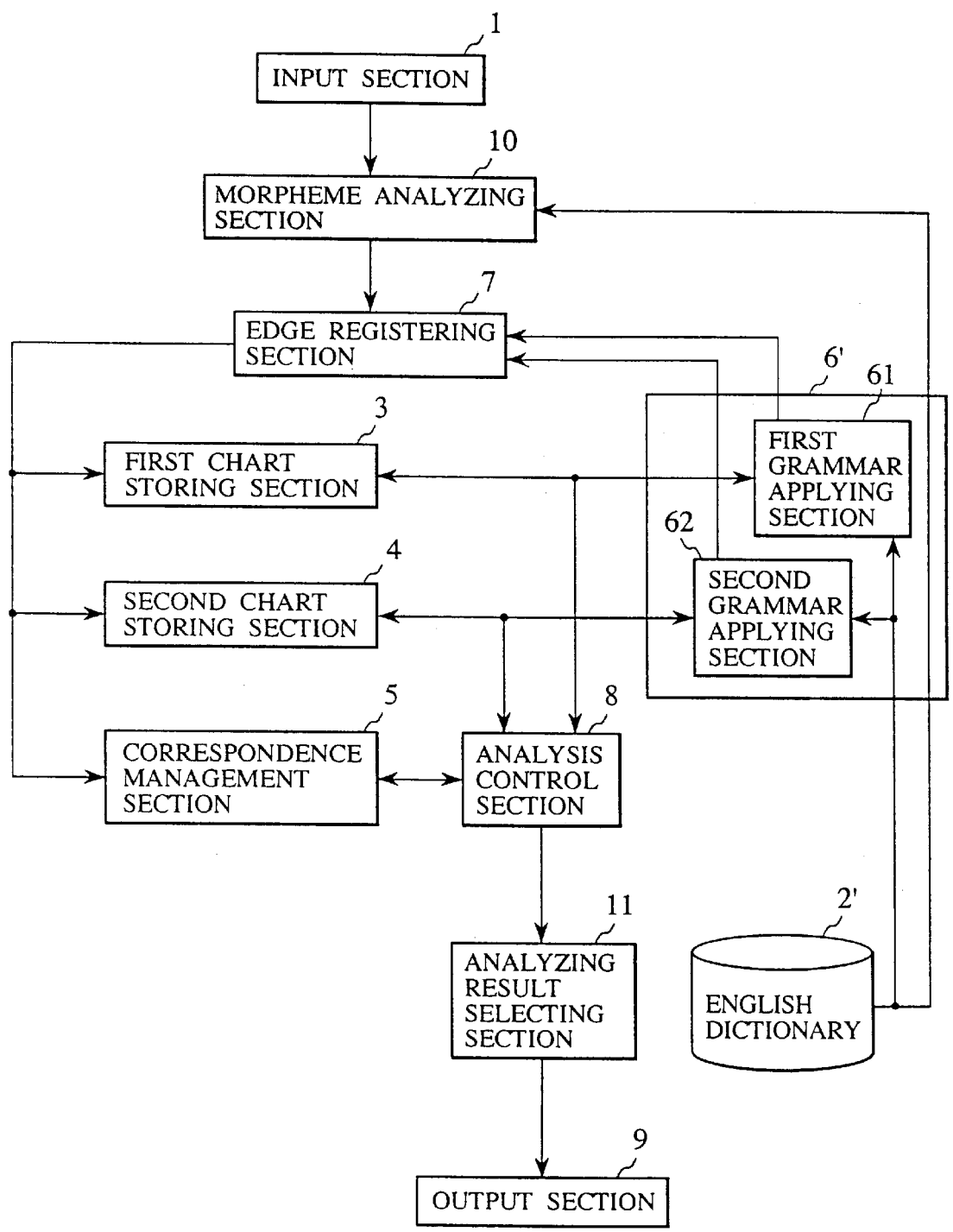
FIG. 5 is a block diagram showing the function structure of a natural language analyzing system according to a second embodiment of the present invention.

A natural language analyzing system according to the second embodiment analyzes English syntax. FIG. 5 is a block diagram showing the functional structure of the natural language analyzing system according to the second embodiment. This natural language analyzing system has an input section 1, an English dictionary 2', a first chart storing section 3, a second chart storing section 4, a correspondence management section 5, a grammar applying section 6' having a first grammar applying section 61 and a second grammar applying section 62, an edge registering section 7, an analysis control section 8, an output section 9, a morpheme analyzing section 10 and an analyzing result selecting section 11.

The English dictionary 2' stores syntax information on words and the rules of the dependency grammar concerning the words. As regards two adjacent edges contained in the first chart, the first grammar applying section 61 produces connective local analyzing result in which the edges have been connected with each other by the dependency relation, adopting the rules of the dependency grammar stored in the English dictionary 2'. As regards two adjacent edges contained in the second chart, the second grammar applying section 62 creates connective local analyzing result in which the edges have been connected with each other by the dependency relation, adopting the rules of the dependency grammar stored in the English dictionary 2'. With reference to the English dictionary 2', the morpheme analyzing section 10 morphemically analyzes an English sentence which has been input from the input section 1, and divides the sentence into strings of English words. The analyzing result selecting section 11 selects edges to be output as the analyzing result, among the edges contained in the first chart.

Based on the strings of English words morphemically analyzed by the morpheme analyzing section 10, the edge registering section 7 creates initial first and second charts to be stored in the first and second chart storing sections 3 and 4, respectively. The edge registering section 7 also registers, as edges, the connective local analyzing result newly produced by the first and second grammar applying sections 61 and 62 in the first and second charts, and updates the contents of the correspondence management section 5. The output section 9 outputs the edges selected by the analyzing result selecting section 11 as the analyzing result.

Figure 6:
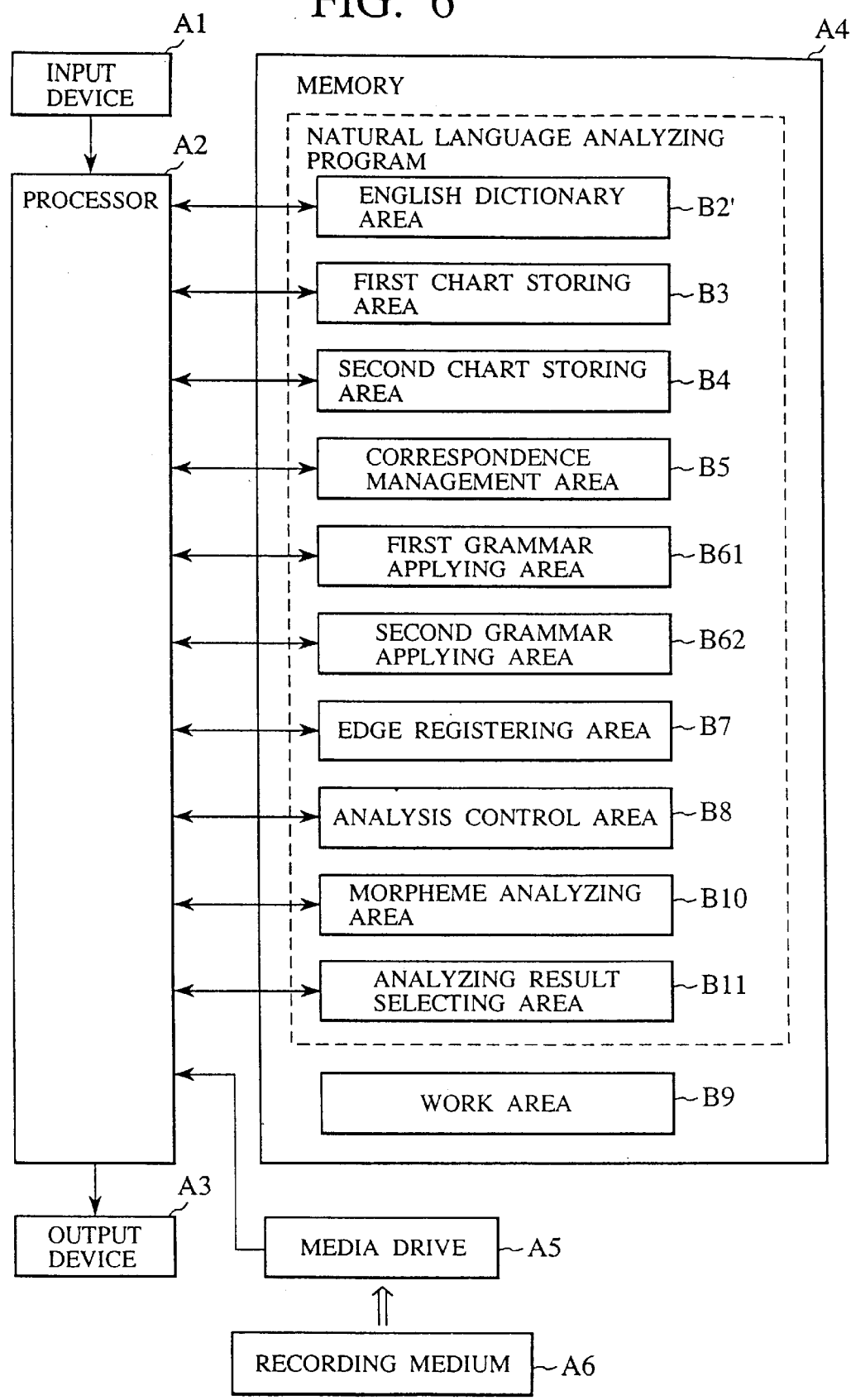
FIG. 6 is a block diagram showing the structure of a computer system which accomplishes the natural language analyzing system shown in FIG. 5.

FIG. 6 is a block diagram illustrating the structure of a computer system which realizes the natural language analyzing system shown in FIG. 5. This computer system is basically the same in structure as that of the first embodiment which is shown in FIG. 2, except that the natural language analyzing program loaded from the storage medium A6 into the storage device 2 in the second embodiment differs from that of the first embodiment, and besides the areas allotted to the memory device A4 in the second embodiment differ from those of the first embodiment.

In the second embodiment, an English dictionary area B2', a first chart storing area B3, a second chart storing area B4, a correspondence management area B5, a first grammar applying area B61, a second grammar applying area B62, an edge registering area B7, an analysis control area B8, a morpheme analyzing area B10 and an analyzing result selecting area B11 are allotted to the memory device A4 in accordance with the natural language analyzing program loaded from the storage medium A6. A work area B9 is also provided in the memory device A4.

Of the above-described areas, the areas which are not used in the first embodiment will now be explained. The English grammar storing area B2' stores the English dictionary shown in FIG. 5. The first grammar applying area B61 stores a program for realizing the first grammar applying section 61 shown in FIG. 5. The second grammar applying area B62 stores a program for realizing the second grammar applying section 62 shown in FIG. 5. The morpheme analyzing area B10 stores a program for realizing the morpheme analyzing section 10 shown in FIG. 5. The analyzing result selecting area B11 stores a program for realizing the analyzing result selecting section 11 shown in FIG. 5.

The processor A2 executes the programs stored in the first grammar applying area B61, the second grammar applying area B62, the morpheme analyzing area B10 and the analyzing result selecting area B11, thereby realizing the function of each of the first grammar applying section 61, the second grammar applying section 62, the morpheme analyzing section 10 and the analyzing result selecting section 11.

Figure 7:
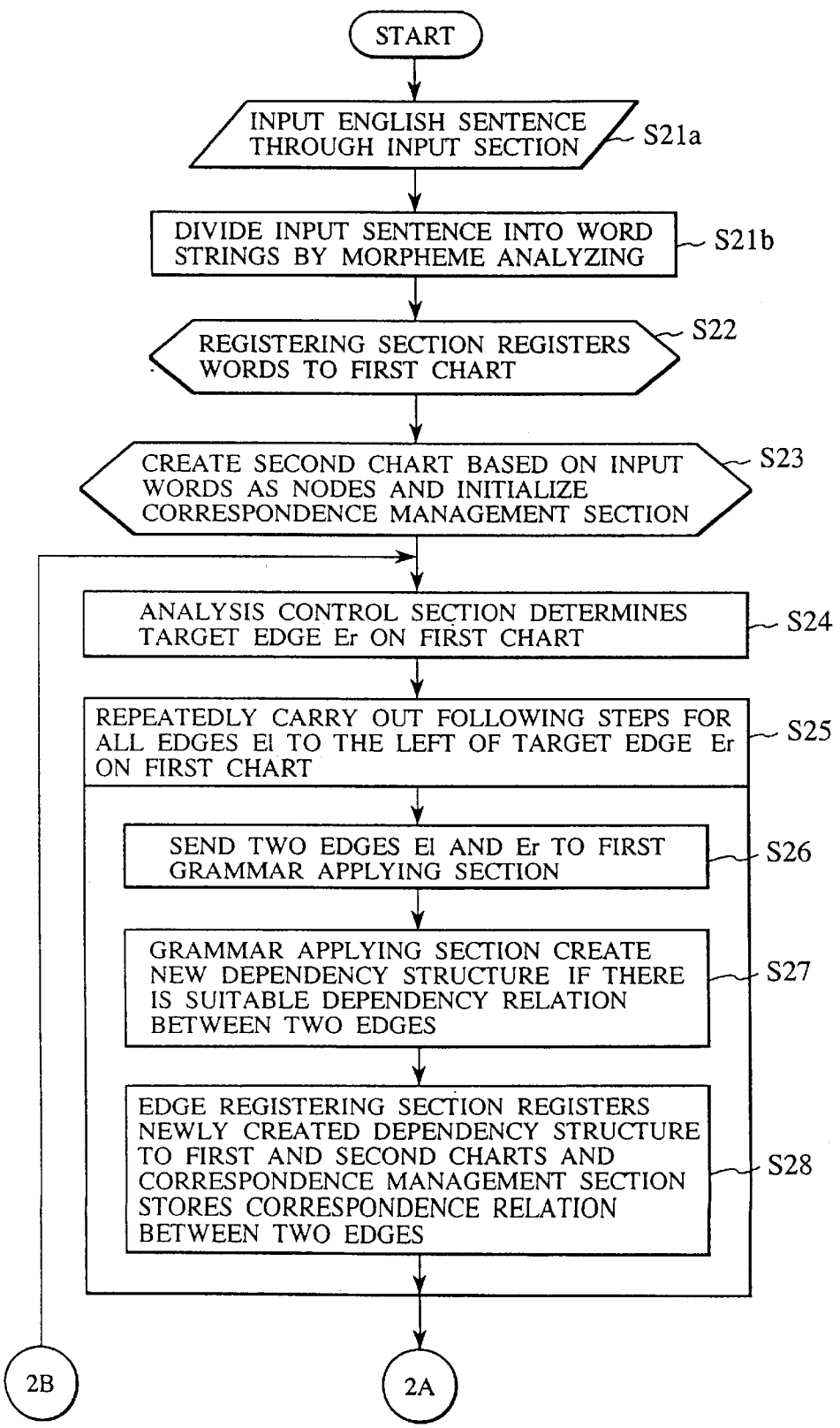
FIG. 7 is a flowchart showing the steps to be executed by the natural language analyzing system shown in FIG. 5.
Figure 8:
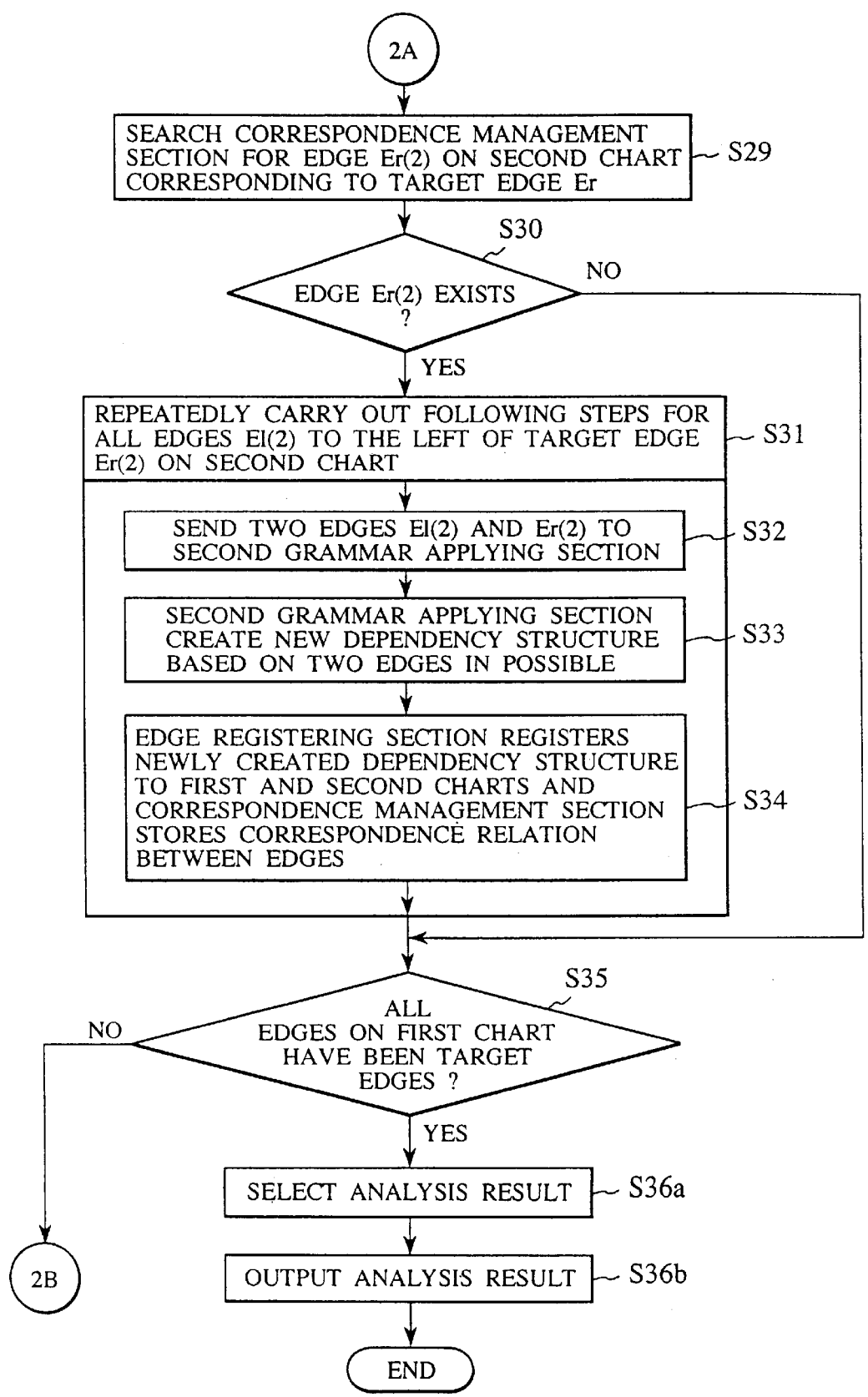
FIG. 8 is a flowchart showing the steps to be executed by the natural language analyzing system.

The operation of the natural language analyzing system according to the second embodiment will now be explained with reference to the flowcharts of FIGS. 7 and 8. Explanations which will be made hereinafter in regard to the operation of the natural language analyzing system are based on the functional block diagram illustrated in FIG. 5.

The input section 1 inputs an English sentence to be analyzed (a step S21a). The English sentence which has been input from the input section 1 is sent to the morpheme analyzing section 10. Morphemically analyzing the English sentence which has been input from the input section 1 with reference to the English dictionary 2', the morpheme analyzing section 10 divides the input English sentence into strings two or more words (a step S21b).

The morpheme analyzing section 10 sends the divided strings of words to the edge registering section 7. The edge registering section 7 creates the initial first chart which contains the words as edges, with the locations of the beginning and end of each string of words received from the morpheme analyzing section 10 and the locations between the words being nodes, after which the edge registering section 7 stores the created first chart in the first chart storing section 3 (a step S22). Next, the edge registering section 7 creates the initial second chart which contains no edges, with the words included in the received strings of words being nodes, after which the edge registering section 7 stores the created second chart in the second chart storing section 4. Furthermore, the edge registering section 7 initializes the correspondence management section 5 (a step S23).

After the initial first and second charts have been thus created, the analysis control section 8 is activated so that the analysis control section 8, the first grammar applying section 61, the second grammar applying section 62 and the edge registering section 7 start the analysis of the syntax of the input English sentence. The analysis of the syntax is performed in accordance with a bottom-up method and the chart method which analyzes the sentence from left to right. The process of analyzing the syntax will be described below in detail:

The analysis control section 8 determines a target edge Er among the edges retained in the first chart (a step S24). Then, the analysis control section 8 sequentially determines, as an edge El, adjacent edges located on the left side of the target edge Er, and repeats steps S26 to S28 with respect to each of the determined edges (a step S25).

The analysis control section 8 sends the edge El and the target edge Er to the first grammar applying section 61 (a step S26). With reference to the rules of the dependency grammar stored in the English dictionary 2', the first grammar applying section 61 checks whether there is any connective dependency relation between the words located at both ends of the two edges El and Er. In the case where there is the connective dependency relation between them, the first grammar applying section 61 produces local analyzing result in which the words located at both ends have been connected with each other by the connective dependency relation, and sends the produced result to the edge registering section 7 (a step S27).

Before thus newly generating the local analyzing result, the first grammar applying section 61 determines whether one of two conditions is satisfied. One condition is that all of words other than the words located at both ends of each of the local analyzing result to be newly generated be in the state of having undergone the application of the grammar rules. The other condition is that all of words other than the words located at both ends of each of the local analyzing result to be newly generated become such a state by being connected with each other by the dependency relation. In the case where neither of these conditions is satisfied, the first grammar applying section 61 does not generate the local analyzing result. The above-described conditions ensure the grammatical functions of the local analyzing result after generated being determined only by the words located at both ends of the edges. Therefore, by packing the local analyzing result as will be explained later, the natural language analyzing system of this embodiment can complete the analysis of the syntax of the input English sentence through calculations of an amount on the order of the third power of the number of words.

The local analyzing result produced by the step S27 is sent from the first grammar applying section 61 to the edge registering section 7. Having received the local analyzing result from the first grammar applying section 61, the edge registering section 7 registers the received result as edges in the first and second charts. However, in the case where a word located at one end of the newly prepared edge coincide with a word located at one ends of the edge which has been already registered in the charts, and the newly prepared edge and the registered edge have the same grammatical function, the edge registering section 7 packs the newly prepared edge with the registered edge as representative edges so that a later application of the grammatical rules will be performed with only the representative edges being set as target edges. Furthermore, the edge registering section 7 registers, in the correspondence management section 5, the correspondence between the two edges registered in the first and second charts (a step S28).

Having finished the above-described processing with respect to all edges located on the left side of the edge Er, the analysis control section 8 retrieves an edge Er (2) corresponding to the target edge Er from the correspondence management section 5 (a step S29). By determining whether the edge Er (2) could be detected from the correspondence management section 5, the analysis control section 8 determines whether the edge Er (2) is present on the second chart (a step S30). In the case where the analysis control section 8 determines that the edge Er (2) is not present on the second chart, then the analysis control section 8 carries out a step S35 which will be described later.

In the case where the analysis control section 8 determines that the edge Er (2) is present on the second chart, then the analyzing control section 8 sequentially acquires, as an edge El (2), adjacent edges located on the left side of the edge Er (2) retained in the second chart, and repeats steps S32 to S34 with respect to each of the acquired edges (a step S31).

As in the case of the first chart, the analysis control section 8 firstly sends the edge El (2) and the edge Er (2) to the second grammar applying section 62 (a step S32). With reference to the dependency grammar rules stored in the English dictionary 2', the second grammar applying section 62 checks whether the edges located at both ends of the two edges El (2) and Er (2) can be connected with each other by the connective dependency relation. In the case where they can be connected with each other by the connective dependency relation, then the second grammar applying section 62 produces local analyzing result in which the words located at both ends have been connected with each other by the connective dependency relation, and sends the produced result to the edge registering section 7 (a step S33).

The second grammar applying section 62, as well as the first grammar applying section 61, checks whether one of two conditions is satisfied. One condition is that all of words other than the words located at both ends of each of the local analyzing result to be newly generated be in the state of having undergone the application of the grammar rules. The other condition is that all of words other than the words located at both ends of each of the local analyzing result to be newly generated become such a state by being connected with each other by the dependency relation. In the case where neither of these conditions is satisfied, the second grammar applying section 62 does not generate the local analyzing result. The second grammar applying section 62 differs from the first grammar applying section 61 in that the second grammar applying section 62 can create a connective dependency structure as the local analyzing result without newly introducing the dependency relation, because two adjacent edges on the second chart share a word located therebetween.

The edge registering section 7 receives the local analyzing result from the second grammar applying section 62, and registers them as edges in the first and second charts. The edge registering section 7 further registers, in the correspondence management section 5, the correspondence between the two edges registered in the first and second charts (a step S34). If necessary, the edge registering section 7 packs the edges as in the case of the first chart.

Having completed processing with respect to all possible edges El (2), the analysis control section 8 again make a reference to the first chart and determines whether any edge to be dealt with the target edge remains on the first chart (a step S35). In the case where the analysis control section 8 determines in the step S35 that such an edge remains on the first chart, the analysis control section 8 returns to the step S24, determines the next target edge Er and repeats the steps following the step S24.

In the case where the analysis control section 8 determines in the step S35 that such an edge does not remain on the first chart, the analyzing result selecting section 11 is activated. The analyzing result selecting section 11 gains access through the analysis control section 8 to the first chart stored in the first chart storing section 3, and acquires an edge established throughout the first chart and which is appropriate as the analyzing result, thus selecting the appropriate analyzing result (a step S36a). The analyzing result selecting section 11 passes the selected edges to the output section 9. The output section outputs the edge received from the analyzing result selecting section 11 as the analyzing result (a step S36b).

The detailed structures (and operations) of the individual parts forming the natural language analyzing system of this embodiment will now be explained.

Figure 9:
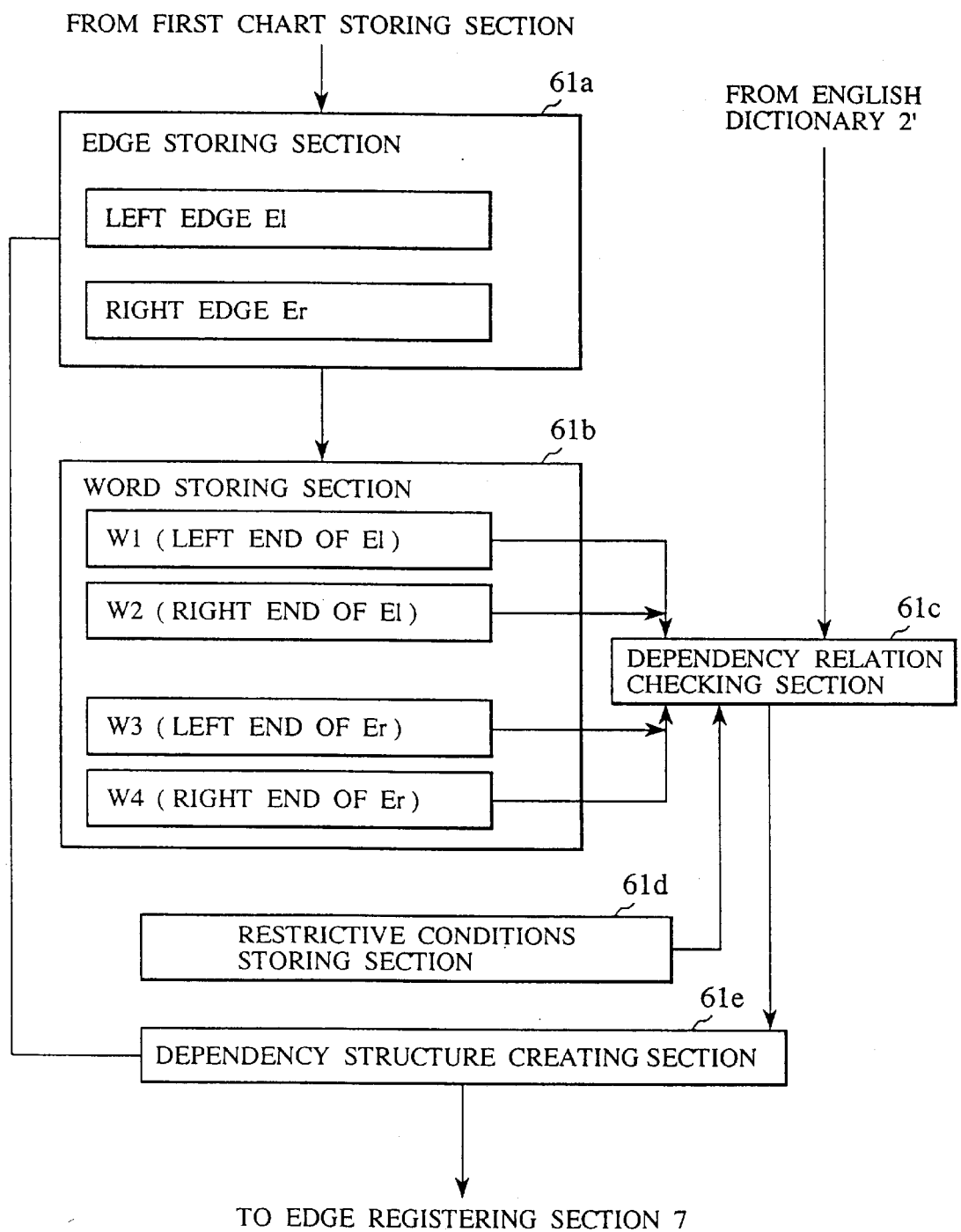
FIG. 9 is a block diagram showing the structure of a first grammar applying section shown in FIG. 5.

The detailed structures and operations of a first grammar applying section 61 will now be described. FIG. 9 is a diagram exemplifying the detailed structure of the first grammar applying section 61. As illustrated, the first grammar applying section 61 comprises an edge storing section 61a, a word storing section 61b, a dependency relation checking section 61c, a restrictive conditions storing section 61d, and a dependency structure creating section 61e.

The edge storing section 61a stores a target edge (right edge) Er and the edge (left edge) El on the left of the edge Er in the first chart sent from the first chart storing section 3. The word storing section 61b stores words which will be constructional elements of the edges related to applying the dependency grammar rule to the edges stored in the edge storing section 61a.

The dependency relation checking section 61c checks whether the dependency relations can be established among the words stored in the word storing section 61b while referring to the English dictionary 2'. The restrictive conditions storing section 61d stores restriction conditions used by the dependency relation checking section 61c. The dependency relation creating section 61e generates a local analysis result in which the words stored in the word storing section 61b are connected each other with the dependency relations, on the basis of the check result from the dependency relation checking section 61c. The dependency structure creating section 61e sends thus created local analysis result to the edge registering section 7.

Figure 10:
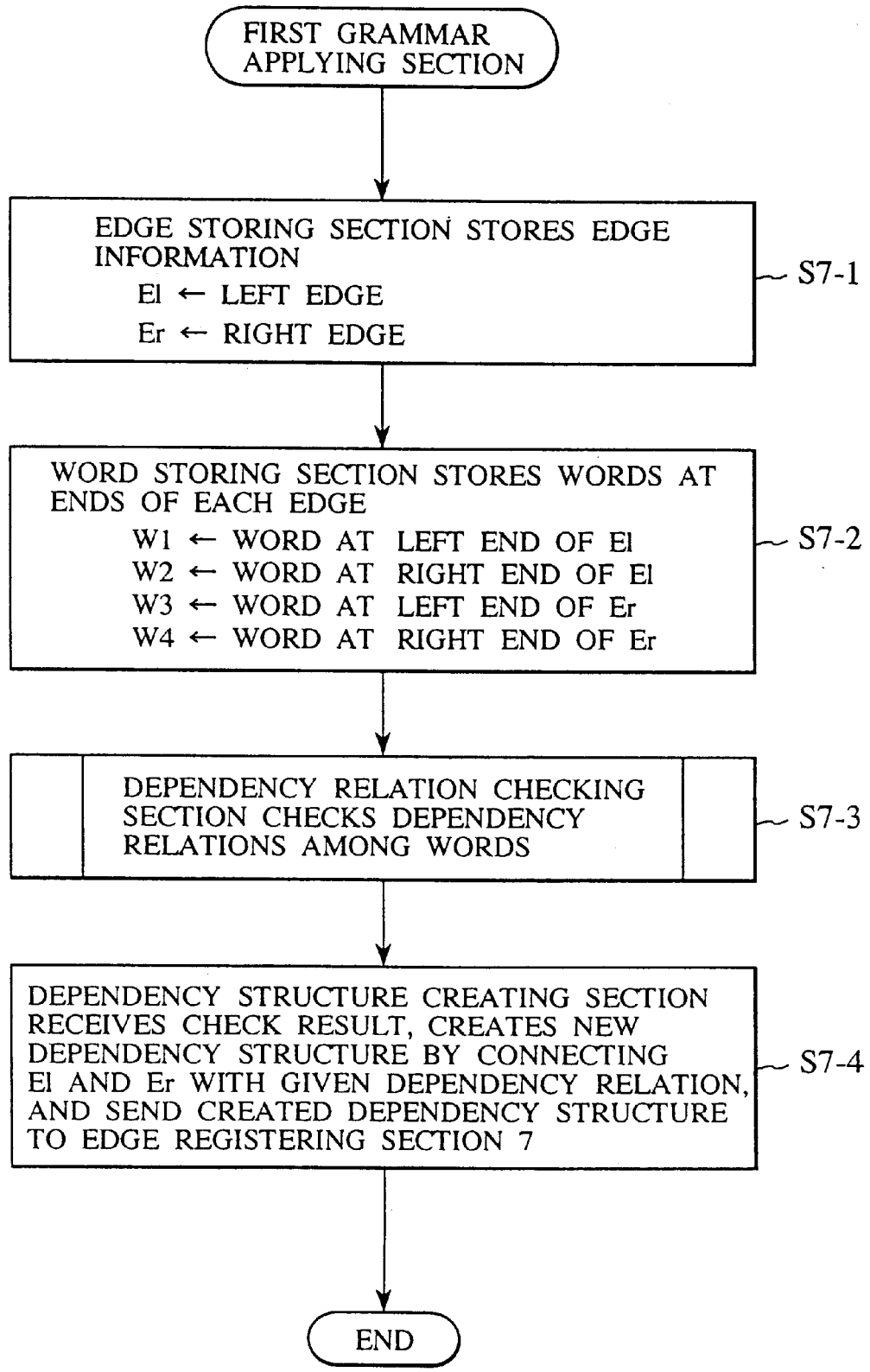
FIG. 10 is a flowchart showing the steps to be executed by the first grammar applying section shown in FIG. 9.

FIG. 10 is a flowchart for explaining operations of the first grammar applying section 61 shown in FIG. 9. First, the edge storing section 61a stores the left edge El and the right edge Er (step S7-1).

The word storing section 61b extracts four words relating to applying the dependency grammar rule to the edges from the left edge El and the right edge Er stored in the edge storing section 61a, and stores the extracted words (step S7-2). The four words relating to the dependency grammar application include a word W1 which is the left end word in the edge El, a word W2 which is the right end word in the edge El, a word W3 which is the left end word in the edge Er, and a word W4 which is the right end word in the edge Er.

In a case where the left edge El contains only one word, the word storing section 61b stores that word as the word W1 and stores NULL as the word W2. In a case where the right edge Er contains only one word, the word storing section 61b stores that word as the word W4 and stores NULL as the word W3. Only the words at the ends of each edge are required to check the dependency relation between the left edge El and the right edge Er, because it is guaranteed that words except both ends of each edge do not have any relations with other words in other edges. The first grammar applying section 61 and the second grammar applying section 62 control the created edges so that only the ends words have relations to others.

And then, the dependency relation checking section 61c obtains words from the word storing section 61b for checking whether new dependency relations among those words can be established or not. The dependency relation checking section 61c investigates the dependency relations among the words with reference to the English dictionary 2', and checks restriction for the dependency relations based on positions of the words with reference to the restrictive conditions storing section 61d. Thus, the dependency relation checking section 61c gains groups of dependency relations which will be established eventually (step S7-3). The restrictive conditions storing section contains written restriction which restricts newly generated dependency structure so that only words at both ends of each edge have relation with other words in other edges.

The dependency relation checking section 61c sends the dependency relations, which has been passed the check, to the dependency structure creating section 61e. The dependency structure creating section 61e creates new dependency structure (step S7-4). The newly created dependency structure has connected structure as a whole because connective two dependency structures are connected with the dependency relations. The dependency structure creating section 61e supplies the created dependency structure to the edge registering section 7. The edge registering section 7 registers the dependency structure to the first and second charts.

Figure 11:
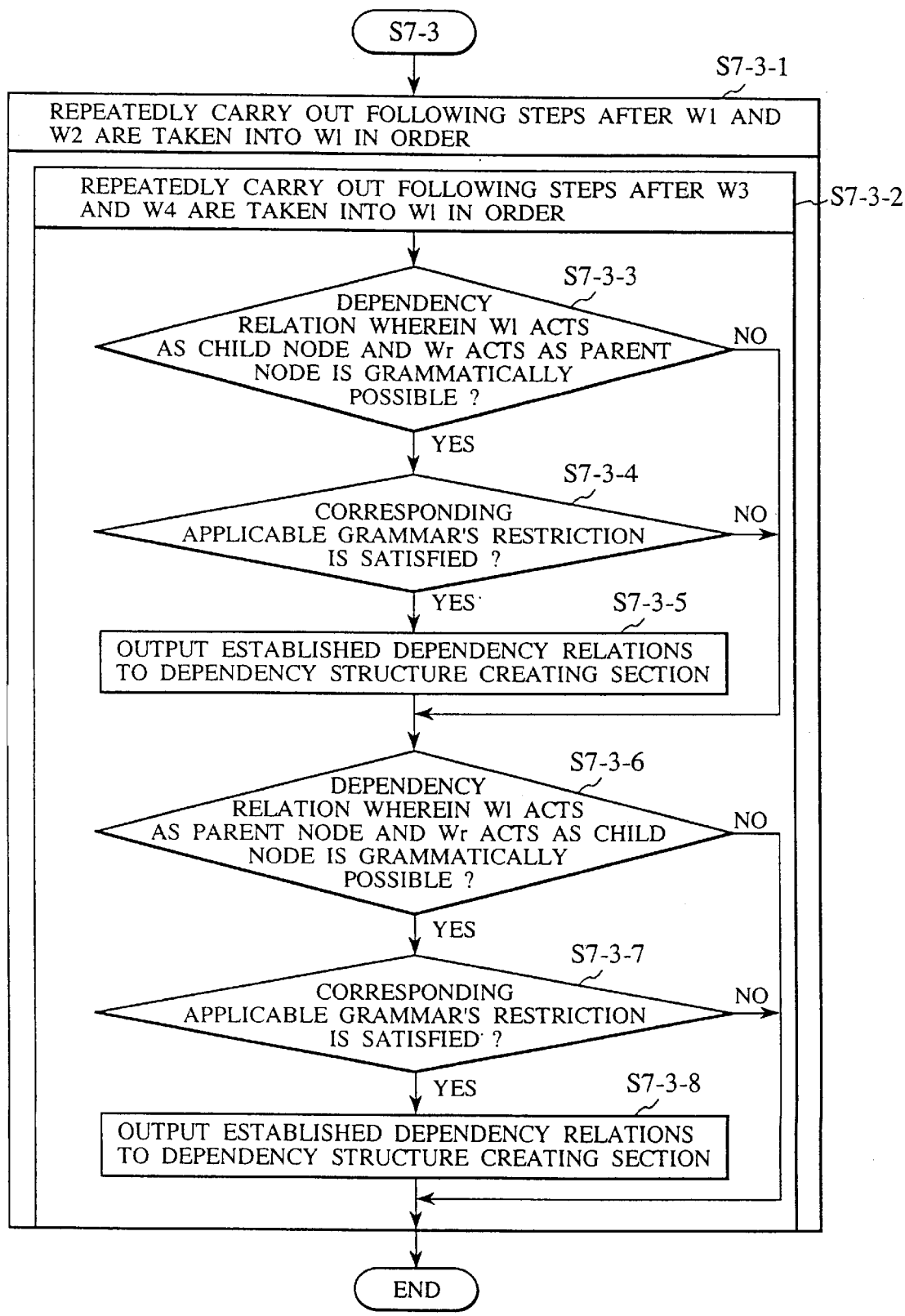
FIG. 11 is a flowchart precisely showing the step S7-3 shown in FIG. 10.

FIG. 11 is a flowchart precisely showing the steps executed by the dependency relation checking section 61c in step S7-3 shown in FIG. 10. The dependency relation checking section 61c discriminates whether it is able to establish the dependency relations among words which are combined in four groups (word W1, word W3), (word W1, word W4), (word W2, word W3), and (word W2, word W4) (steps S7-3-3 to S7-3-8) repeatedly (steps S7-3-1 and S7-3-2).

FIGS. 13A to 13H are diagrams schematically showing examples of the dependency relations each establishable between the edge El and the edge Er. In these diagrams, left edges are edge El and right edges are edge Er. The edge El has the word W1 at left end and the word W2 at right end. The edge Er has the word W3 at left end and the word W4 at right end. Each of the edge El and the edge Er has connective dependency structure. Only end words in the edge El and the edge Er have relations with other words in other edges. Looped dependency relations or plural parents are prohibited in the edges El and Er. Accordingly, eight patterns of the dependency relations between the edges El and Er are able to be established as shown in FIGS. 13A to 13H.

Figure 13A:
FIGS. 13A to 13H are schematic diagrams for explaining dependency relations between two edges to be handled by the first grammar applying section shown in FIG. 9.
Figure 13B:
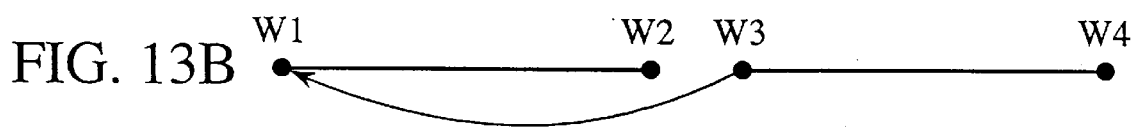
Figure 13C:
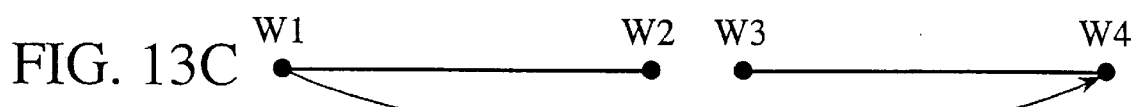
Figure 13D:
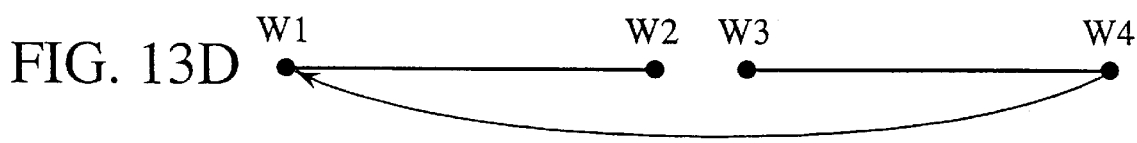
Figure 13E:
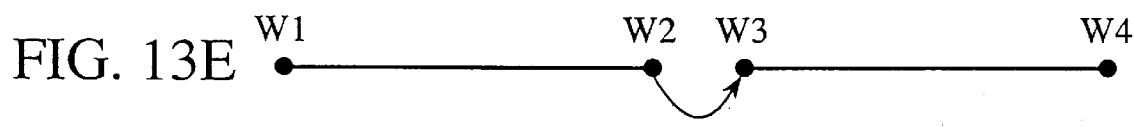
Figure 13F:
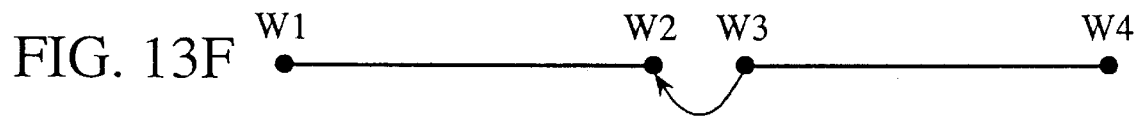
Figure 13G:
Figure 13H:
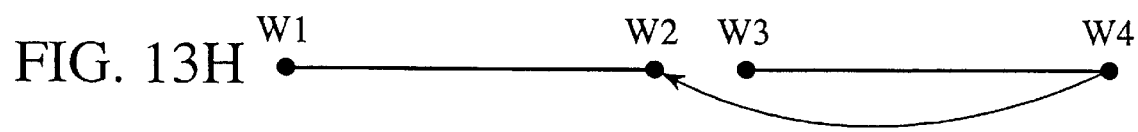

FIG. 13A shows a case where the word W1 at the left end of the edge El depends on the word W3 at the left end of the edge Er. FIG. 13B shows a case where the word W3 at the left end of the edge Er depends on the word W1 at the left end of the edge El. FIG. 13C shows a case where the word W1 at the left end of the edge El depends on the word W4 at the right end of the edge Er. FIG. 13D shows a case where the word W4 at the right end of the edge Er depends on the word W1 at the left end of the edge El. FIG. 13E shows a case where the word W2 at the right end of the edge El depends on the word W3 at the left end of the edge Er. FIG. 13F shows a case where the word W3 at the left end of the edge Er depends on the word W2 at the right end of the edge El. FIG. 13G shows a case where the word W2 at the right end of the edge El depends on the word W4 at the right end of the edge Er. FIG. 13H shows a case where the word W4 at the right end of the edge Er depends on the word W2 at the right end of the edge El.

The dependency relation checking section 61c checks the eight patterns of the dependency relations whether establishable or not, and outputs established ones. This checking action includes a grammatical check and a structural check. During the grammatical checking, words are investigated whether those are connectable with a dependency relation based on each word's property and grammatical rule. That is, the grammatical checking is general check for determine applicability of the grammatical rule. The structural checking is one of the features of this invention. This check is carried out in order to guarantee that only the words at ends of each edge have relation with other words in other edges under the situation of the dependency structure in which two dependency structures are connected with the new dependency relation. Knowledge for the structural checking is written in a file stored in the restrictive conditions storing section 61d. The dependency relation checking section 61c carries out the structural check with reference to the file.

As for the steps S7-3-1 and S7-3-2 which are repeatedly carried out in the flowchart shown in FIG. 11, the dependency relation checking section 61c determines whether dependency relations in which a word Wl (representing any one of the word W1 at the left end of the edge El or the word W2 at the right end thereof) is a child node and a word Wr (representing any one of the word W3 at the left end of the edge Er or the word W4 at the right end thereof) is a parent node with reference to the word's property and the grammatical rule (step S7-3-3). The action done by step S7-3-3 corresponds to the above described grammatical checking. If it is found a dependency relation which has not been a common satisfied relation between the words Wl and Wr while the word Wl can act as a child node and the word Wr can act as a parent node, this relation is determined that establishable relation.

If it is determined that there is an establishable dependency relation by step S7-3-3, the dependency relation checking section 61c checks the restriction conditions stored in the restrictive conditions storing section 61d (step S7-3-4). This action carried out by step S7-3-4 corresponds to the above mentioned structural checking. If it is determined that the restriction conditions are satisfied by step S7-3-4, the dependency relation checking section 61c sends the dependency relation concerned to the dependency structure creating section 61e (step S7-3-5).

If it is determined that any one of the checks by step S7-3-3 or S7-3-4 is failed, the dependency relation checking section 61c does not output the dependency relation concerned and the flow goes to step S7-3-6. In steps S7-3-6 to S7-3-8, the dependency relation checking section 61c carries out actions in the same manner in the above described steps S7-3-3 to S7-3-5 to find a case where the word Wl acts as a parent node and the word Wr acts as a child node. FIG. 12 is a diagram exemplifying the contents of the restrictive conditions to be stored in the restrictive conditions storing section 61d. As shown in FIG. 12, the restrictive conditions storing section 61d stores restriction conditions for allowable dependencies. The conditions are prepared for combinations of left word Wl, right word Wr and dependency direction. The purpose of the restrictive conditions storing section 61d is to guarantee that grammar application to words except words at ends of each edge has been already finished in the dependency structure wherein the word Wl and the word Wr are connected each other with the designated direction.

For example, a first entry requires two conditions for allowing the dependency relation in which the word W1 acts as a child node and the word W3 acts as a parent node. One condition requires that grammar application to the word W2 has been finished, and the other requires that the application of the new dependency relation is the last grammar application to the word W3. If a word's must-to-have dependency relation is fully satisfied with the dependency relation owned by the word, it is regarded that applying grammar rule to the word has been finished.

More precisely, for example, a fixed form transitive verb "eat" requires a direct object as a child node on the right thereof and a subject as a child node on the left thereof. This relation is must-to-have relation for the word "eat". This word may also have an adverbial modification element with it on the right thereof as a child node. This dependency relation is arbitrarily selectable. Under such supposition, if the fixed form transitive verb "eat" has already had a dependency relation with the direct object on the right thereof and had another dependency relation with the subject on the left thereof, this circumstance indicates that applying the grammatical rule to "eat" has been finished. On the contrary, if the fixed form transitive verb "eat" has any one of the dependency relations, applying to the grammatical rule to "eat" is not regarded as "finished". The adverbial modification element does not influence the judgement whether applying to the grammatical rule to "eat" has been finished or not.

The restriction stored in the restrictive conditions storing section 61d basically focuses whether or not applying to the grammatical rule to the words W2 and W3 has been finished after the dependency relations were established. If the word W2 or W3 has unsatisfied essential dependency relation, connecting that word to the other word will be required later in order to satisfy the essential dependency relation. However, since both the words W2 and W3 are in the new dependency structure, those will not be connected to others with a dependency relation. Such dependency structure by which the restriction conditions are obviously unsatisfied will not be stored in the first and second charts as an edge because it is regarded as an unsuitable dependency structure.

Figure 14:
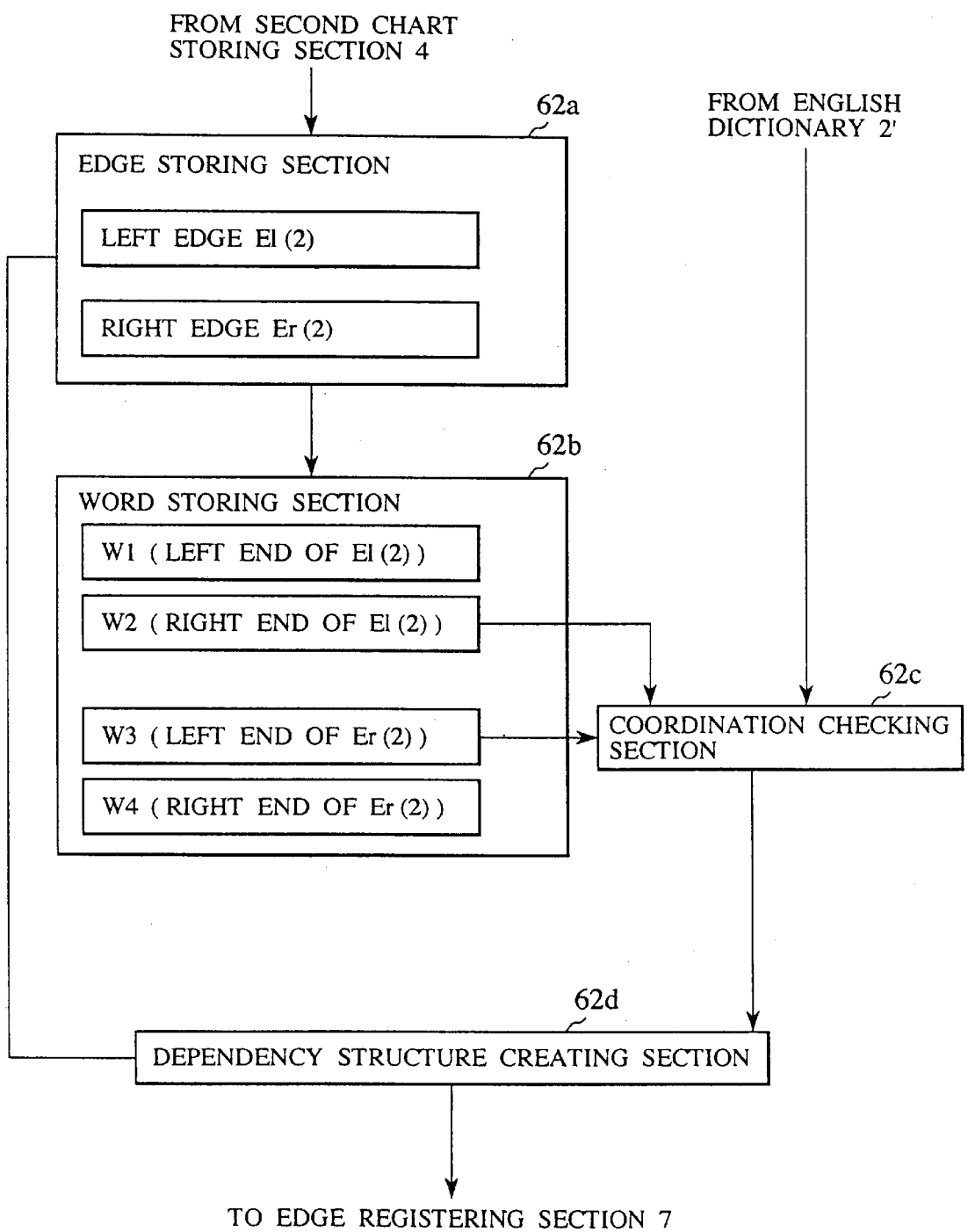
FIG. 14 is a block diagram showing the structure of a second grammar applying section shown in FIG. 5.

The detailed structure and operations of the second grammar applying section 62 will now be described. FIG. 14 is a diagram exemplifying the detailed structure of the second grammar applying section 62. As illustrated, the second grammar applying section 62 comprises an edge storing section 62a, a word storing section 62b, a coordination checking section 62c, and a dependency structure creating section 62d.

The edge storing section 62a stores the edge Er (2) (right edge Er (2)) corresponding to the target edge Er and the edge El (2) (left edge El (2)) on the left of the edge Er (2) sent from the second chart storing section 4. The word storing section 62b stores words at both ends of each edge of the edges stored in the edge storing section 62a relating to applying the dependency grammar rule.

The coordination checking section 62c checks the coordination between a word at the eight end of the left edge El (2) and a word at the left end of the right edge Er (2) which are stored in the word storing section 62b with reference to the English dictionary 2'. The dependency structure creating section 62d prepares a local analysis result including the structure in which words stored in the word storing section 62b are connected each other with the dependency relations after receiving a check result of the coordination. The coordination checking section 62c sends the newly prepared local analysis result to the edge registering section 7.

Figure 15:
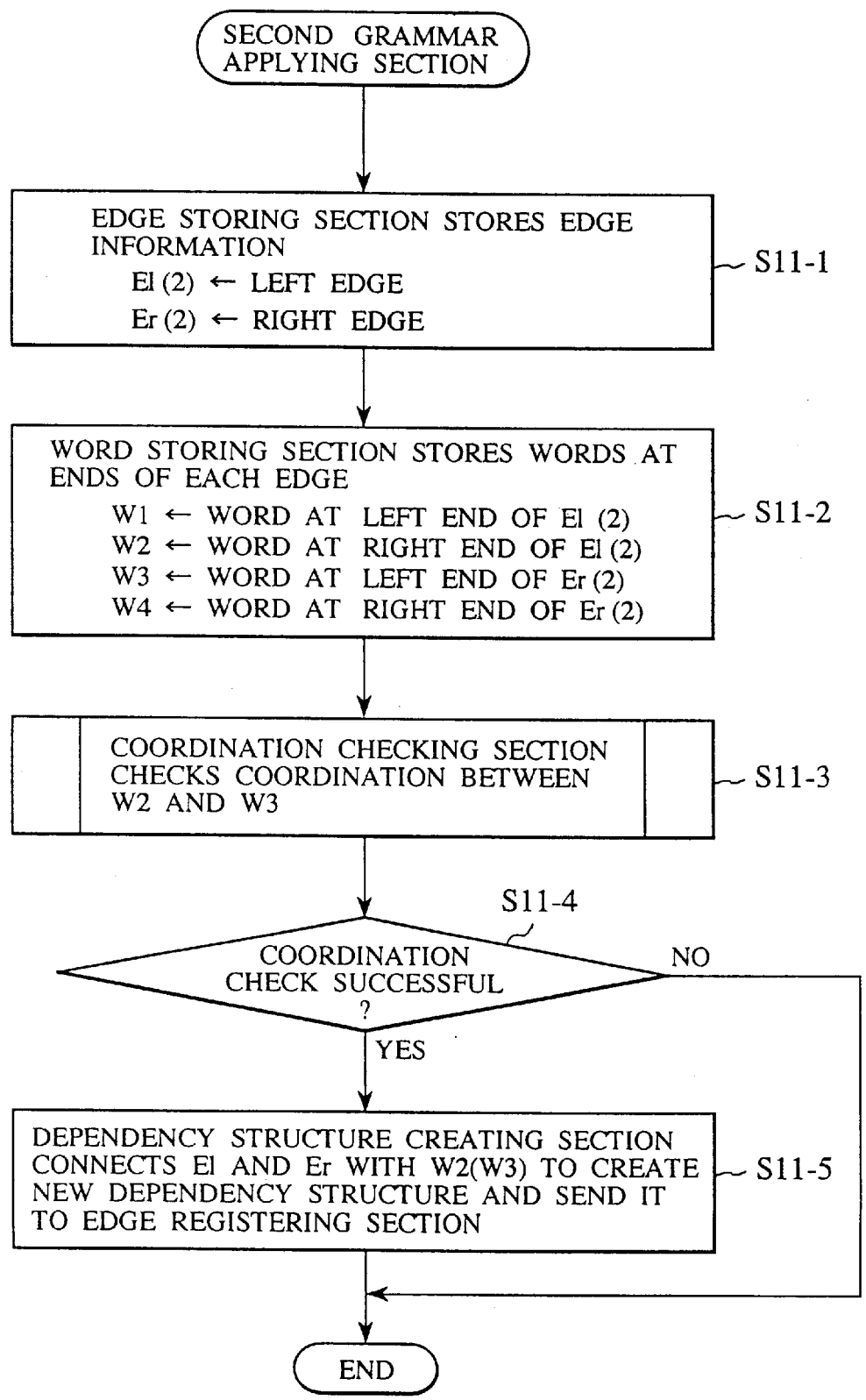
FIG. 15 is a flowchart showing the steps to be executed by the second grammar applying section shown in FIG. 14.

FIG. 15 is a flowchart for explaining operations of the second grammar applying section 62 shown in FIG. 14. First, the edge storing section stores the left edge El (2) and the right edge Er (2) on the second chart which are sent from the second chart storing section 4 (step S11-1).

Then the word storing section 62b extracts four words relating to applying the dependency grammar rule from the left edge El (2) and the right edge Er (2) stored in the edge storing section 62a and stores the extracted words (step S11-2). The word W1 at the left end of the edge El (2), the word W2 at the right end of the edge El (2), the word W3 at the left end of the edge Er (2), and the word W4 at the right end of the edge Er (2) are the four words relating to applying the dependency grammar rule.

As aforementioned, the first grammar applying section 61 and second grammar applying section 62 prepare only the dependency structures in which only words at both ends of each edge have dependency relations with other words in other edges. Since the edge El (2) and the edge Er (2) are adjacent edges in the second chart, the word W2 and the word W3 are the same words (hereinafter referred to as "word Wc"). The word W2 has a dependency relation extending toward inside of the edge El (2) from the word Wc, and the word W3 has a grouped dependency relation extending toward inside of the edge Er (2) from the word Wc.

Then, the coordination checking section 62c checks the supplied words W2 and W3 whether the two kinds of the dependency relations has coordination as a whole, that is, whether the suitable dependency relation for the combined word Wc. The coordination checking section 62c further checks whether applying the grammar rule to the word Wc has been finished or not (step S11-3). The coordination checking section 62c determines whether the coordination check in step 811-3 is successful or not (step S11-4).

If it is determined that the coordination check is successful, the coordination checking section 62c invokes the dependency structure creating section 62d. The dependency structure creating section 62d creates the dependency structure in which the edge El (2) and the edge Er (2) are connected with the word Wc as an intermediate word (step S11-5). In the newly created dependency structure, the word W1 is placed at the left end and the word W4 is placed at the right end. Each words in the new dependency structure has its own dependency relation which was established in the former edge El (2) or Er (2). Only the word Wc has both dependency relations, that is, one established in the edge El (2) for the word W2 and the other established in the edge Er (2) for the word W3. Since the word W3 has not only the dependency relation extending toward the left but also the dependency relation extending toward the right, two connective dependency structures, i.e. the edge El (2) and the edge Er (2), are connected to each other with the intermediate word Wc, thus, it becomes one larger connective dependency structure. According to the former check by the coordination checking section 62c, it is guaranteed that the new connective dependency structure has right coordination.

The coordination checking section 62c supplies thus prepared dependency structure to the edge registering section 7 to register it to the first and second charts as an edge. On the other hand, if it is determined that the coordination check by the coordination checking section 62c was failed, the flow goes to end without doing a significant action.

Figure 16:
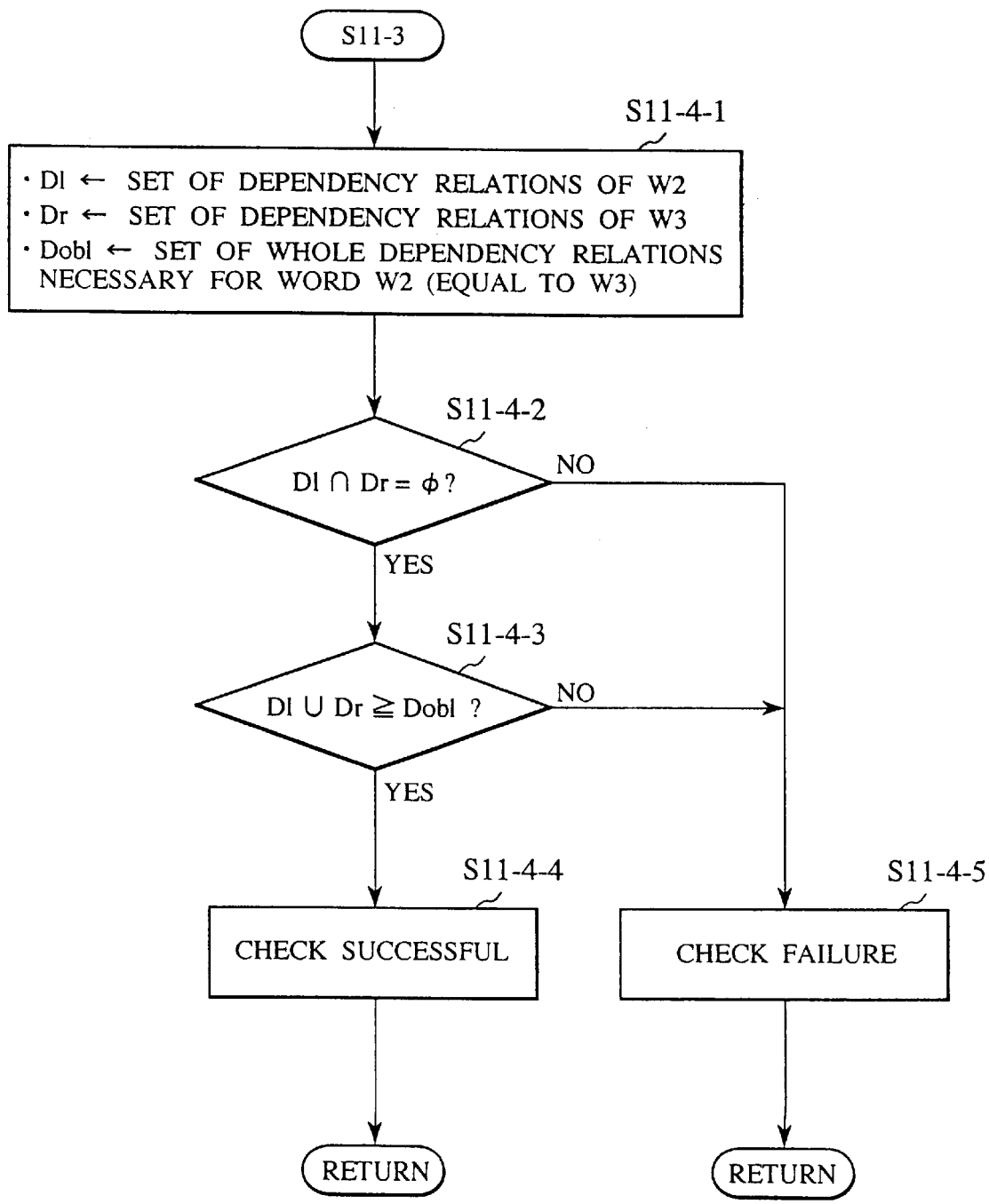
FIG. 16 is a flowchart precisely showing the steps S11-3 and S11-4 shown in FIG. 15.

FIG. 16 is a flowchart showing steps to be executed by the coordination checking section 62c in steps S11-3 and S11-4 shown in FIG. 15. The coordination checking section 62c has three sets Dl, Dr, and Dobl as areas for storing groups of the dependency relations. The coordination checking section 62c also has a set comparing section which obtains a common set or a sum-set among sets of the dependency relations, or compares inclusion relations.

The coordination checking section 62c stores all dependency relations owned by the word W2 to the set Dl, and stores all dependency relations owned by the word W3 to the set Dr. The coordination checking section 62c stores all essential dependency relations which are must-to-have segments for the word W2 (the word same as the word W3, i.e. the word Wc) to the set Dobl (step S1-4-1). It is supposed that applying the grammar rule to the words has not been done at all when the set Dobl is calculated. That is, the set Dobl represents full essential dependency relations for a word in accordance with the word's capability.

The coordination checking section 62c determines whether or not there is any contradictions between the set Dl and the set Dr by checking whether a common set of those groups is empty or not (step S11-4-2). It is indicated that one dependency relation is used twice when the common set is not empty set. Therefore, the coordination checking section 62c does not find any coordination, and the flow returns to the steps shown in FIG. 15 (step S11-4-5). However, there are some dependency relations which are allowed to be used multiple times. In a case where such dependency relation is used, the coordination checking section 62c regards those as separated elements. In this case, no failure is found even if such dependency relation is used twice.

If the common set is empty, the coordination checking section 62c determines whether or not applying the grammar rule to the word Wc is regarded as a finished action after the set Dl and the set Dr are combined with each other (step S11-4-3). If it is determined that applying the grammar rule to the word Wc is regarded as a finished action, the flow goes to step S11-4-5, and the coordination checking section 62c finds out that there is no right coordination. Then the flow returns to the steps shown in FIG. 15. On the contrary, if it is determined in step S11-4-3 that applying the grammar rule the word Wc is regarded as a finished action, the coordination checking section conclude that the coordination check is successful, and the flow returns to the steps shown in FIG. 15 (step S11-4-4).

In step S11-4-2, justness for merging the word W2 and the word W3 is checked. In step S11-4-3, it is checked whether the restriction condition, which defines that the dependency structure in which the inside and the outside is connected with a dependency relation is not allowable, is satisfied or not. Step S11-4-2 corresponds to the aforementioned grammatical check by the dependency relation checking section 61c in the first grammar applying section 61, and step S11-4-3 corresponds to the structural check by the dependency relation checking section 61c.

FIGS. 17A to 17G schematically exemplify the contents of a grammar dictionary 2. FIG. 17A shows a dependency relation rule for a noun "speech". In FIG. 17, arrows represent directions from child nodes to parent nodes. Character strings near the allows represent dependency relation types (name). Solid lines represent essential dependency relations, and broken lines represent arbitrary dependency relations. A symbol "*" at the end of the relation type name represent that the relation is allowed to be used multiple times. For example, the noun "speech" shown in FIG. 17A may be a child node depending on a word on the left thereof with "compl" relation, or may be a parent node having following word on the right thereof with "det" relation and/or "premod" relation. Each relation is arbitrary relation. The "premod" relation can be used multiple times. In the same manner, "postmod" relation is also an arbitrary relation to other word on the left of "speech" which is a parent node.

Dependency relations for a noun "park" shown in FIG. 17B is similar to those for "speech". A preposition "at" shown in FIG. 17C must be related to a word on the right thereof with "compl" relation. The preposition "at" may be a child node related to a word on the left thereof with the "postmod" relation. Dependency relations for a preposition "by" is the same as those for "at". An adjective "long" shown in FIG. 17E must be a child node related to a word on the right thereof with the "postmod" relation. An article "the" shown in FIG. 17F must be a child node related to a word on the right thereof with the "det" relation. An adverbial noun "yesterday" shown in FIG. 17G must be a child node related to a word on the left thereof with the "postmod" relation.

Operations of the natural language analyzing system according to this embodiment will now be described precisely with an example including from the step of inputting a prepositional phrase "by the long speech yesterday at the park" shown in FIG. 18 through the input section to the step of outputting final analysis result by the output section 9.

The prepositional phrase shown in FIG. 18 which is input through the input section 1 is sent to the morpheme analyzing section 10. The morpheme analyzing section 10 divides the input prepositional phrase into word strings with reference to the English dictionary 2', and those are supplied to the edge registering section 7. The edge registering section 7 prepares initial first and second charts based on the word strings from the morpheme analyzing section 10, and stores the prepared charts in the first chart storing section 3 and the second chart storing section 4 respectively. Simultaneously, the edge registering section 7 initializes the contents of the correspondence management section 5.

Figure 19:
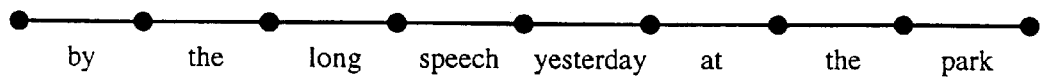
FIG. 19 is a diagram schematically showing an example of a first chart prepared at initial stage for the English sentence shown in FIG. 18.
Figure 20:
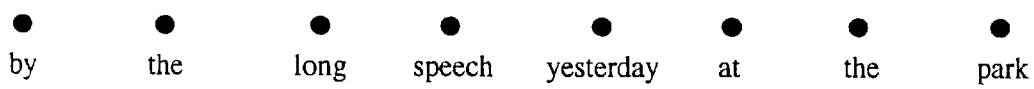
FIG. 20 is a diagram schematically showing an example of a second chart prepared at initial stage for the English sentence shown in FIG. 18.

FIG. 19 schematically shows the present first chart stored in the first chart storing section 3. In the first chart, words from "by" to "park" are aligned as an edge. Nodes are placed at intervals among the words in the first chart. FIG. 20 schematically shows the present second chart stored in the second chart storing section 4. In the second chart, each word is a node (represented by dots in FIG. 20). Dependency relations among the plurality of words have not been established yet, there is no edge having a node at its end in the second chart.

After the initial first and second charts are prepared and stored in the first chart storing section 3 and the second chart storing section 4 respectively, the analysis control section 8 is invoked. The analysis control section 8 starts to analyze the input English sentence from left to right based on the bottom-up chart method while invoking the grammar applying section 6 and the edge registering section 7 at reasonable timings.

The analysis control section 8 selects the head word "by" in the first chart stored in the first chart storing section 3 as the target edge Er. The analysis control section 8 tries to find an edge on the left of the word "by". Since there is no edge on the left of the word "by", the processing for the target edge Er is terminated. Then, the analysis control section 8 access the correspondence management section 5 to find the edge Er (2) corresponding to "by" from the second chart. However, there is no edge in the second chart at the present, no further processing for the edge Er (2) continues.

The analysis control section 8 selects the word "the" in the first chart as the next target edge Er. In the first chart, the analysis control section 8 obtains the word "by" on the left of the target edge Er as the edge El. The analysis control section 8 invokes the first grammar applying section 61 and sends thereto the edge El of the word "by" and the edge Er of the word "the". In the grammar applying section 61, the word storing section 61*b* stores "by" as the word W1, NULL as the word W2, NULL as the word W3, and "the" as the word W4. After this storing action is completed, the dependency relation checking section 61*c* is invoked.

The dependency relation checking section 61*c* checks whether there is dependency relation for connecting those two words with reference to the English dictionary 2'. With reference to FIG. 17D, the word "by" may be a parent node relating to a word on the right thereof with the "compl" relation, and the word "the" may be a child node relating to a word on the right thereof with the "det" relation. However, in a case where "by" and "the" are aligned in this order, it is unable to connect them to each other with a dependency relation. Therefore, the dependency structure creating section 61*e* does not create any new dependency structure and the first grammar applying section 61 terminates its processing. The analysis control section 8 tries to obtain the edge Er (2) corresponding to "by" from the second chart. Since there is no edge corresponding to "by", no further processing for the edge Er (2) are executed. In the same manner, processing in a case where the word "long" is selected as the target edge Er also ends without creating any other dependency structures.

Then, the analysis control section 8 selects the word "speech" in the first chart as the next target edge Er. The analysis control section 8 obtains the word "long" as the edge El because it adjoins the target edge Er on the left thereof in the first chart. The analysis control section 8 invokes the first grammar applying section 61, and sends thereto the edge El of the word "long" and the edge Er of the word "speech". In the first grammar applying section 61, the word storing section 61*b* stores "long" as the word W1, NULL as the word W2, NULL as the word W3, and "speech" as the word W4. After this storing action is completed, the dependency relation checking section 61*c* is invoked.

The dependency relation checking section 61*c* checks whether there is a dependency relation in which the word W1 ("long") as a child node and the word W4 ("speech") as a parent node are connected to each other, with reference to the English dictionary 2'. With reference to FIGS. 17A and 17E, the word "long" may be a child node relating to a word on the right thereof with the "premod" relation, and the word "speech" may be a parent node relating to a word on the left thereof with the "premod" relation. The dependency relation checking section 61*c* determines that it is able to establish a dependency relation of the "premod" relation between the words W1 and W4 ("Yes" at step S7-3-3).

Then, the dependency relation checking section 61*c* checks whether or not the words W2 and W3 satisfy the restrictive conditions with reference to the restrictive conditions storing section 61*d* (step S7-3-4). In this case, since each of the edges El and Er contains one word, conditions for applying the grammar rule are satisfied because both of the words W2 and W3 are empty. The dependency relation checking section 61*c* outputs the establishable dependency relation to the dependency structure creating section 61*e*. The dependency structure creating section 61*e* creates the dependency structure in which the word "long" as a child node and the word "speech" as a parent node are connected to each other with the "premod" relation. The created dependency structure is sent to the edge registering section 7.

Figure 21:
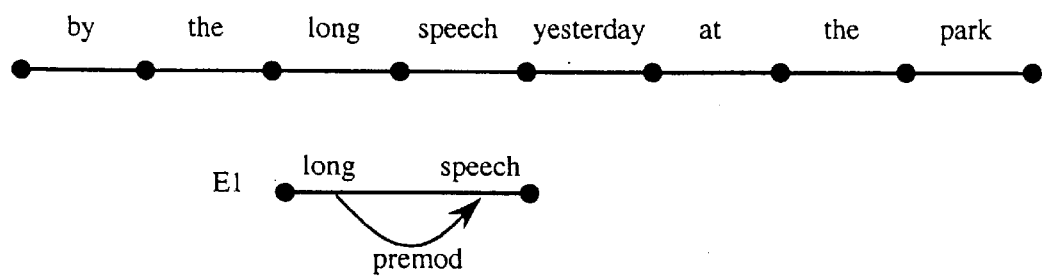
FIG. 21 is a diagram schematically showing an example of the first chart at intermediate stage.

The edge registering section 7 registers the supplied dependency structure to the first and second charts as a new edge. FIG. 21 shows the present contents of the first chart. In FIG. 21, the newly prepared edge is represented by an edge El. FIG. 22 shows the contents of the second chart at the same time. In FIG. 22, the edge E1 also represents the new edge.

The analysis control section 8 selects the edge El in the first chart shown in FIG. 21 as the next target edge Er. The analysis control section 8 obtains the word "the" as the edge El because it adjoins the target edge Er on the left thereof. The first grammar applying section 61*c* hecks the edges Er and El whether or not a dependency relation between them is establishable with reference to the English dictionary 2'. The dependency relation checking section 61*c* finds out an establishable dependency relation between the words "the" as a child node and "speech" as a parent node with "det" relation as shown in FIGS. 17A and 17F (step S11-7-3). Because applying the grammar rule to the word W3 ("long") has been finished, the dependency relation checking section 61*c* determines that the restrictive conditions in step S7-3-4 are satisfied. On the contrary, since there is no dependency relation between the words "the" and "long", a dependency relation between the edges El and Er is only the dependency relation between the words "the" and "speech".

The dependency structure creating section 61*e* creates a new connective dependency structure by connecting the edges El and Er with "det" relation, and sends the new connective dependency structure to the edge registering section 7. The edge registering section 7 registers the supplied dependency structure to the first and second charts as a new edge. FIG. 23 shows the present contents of the first chart. In FIG. 23, an edge E2 represents the newly created and registered edge. FIG. 24 shows the contents of the second chart at the same time. In FIG. 24, the edge E2 also represents the new edge.

Figure 25:
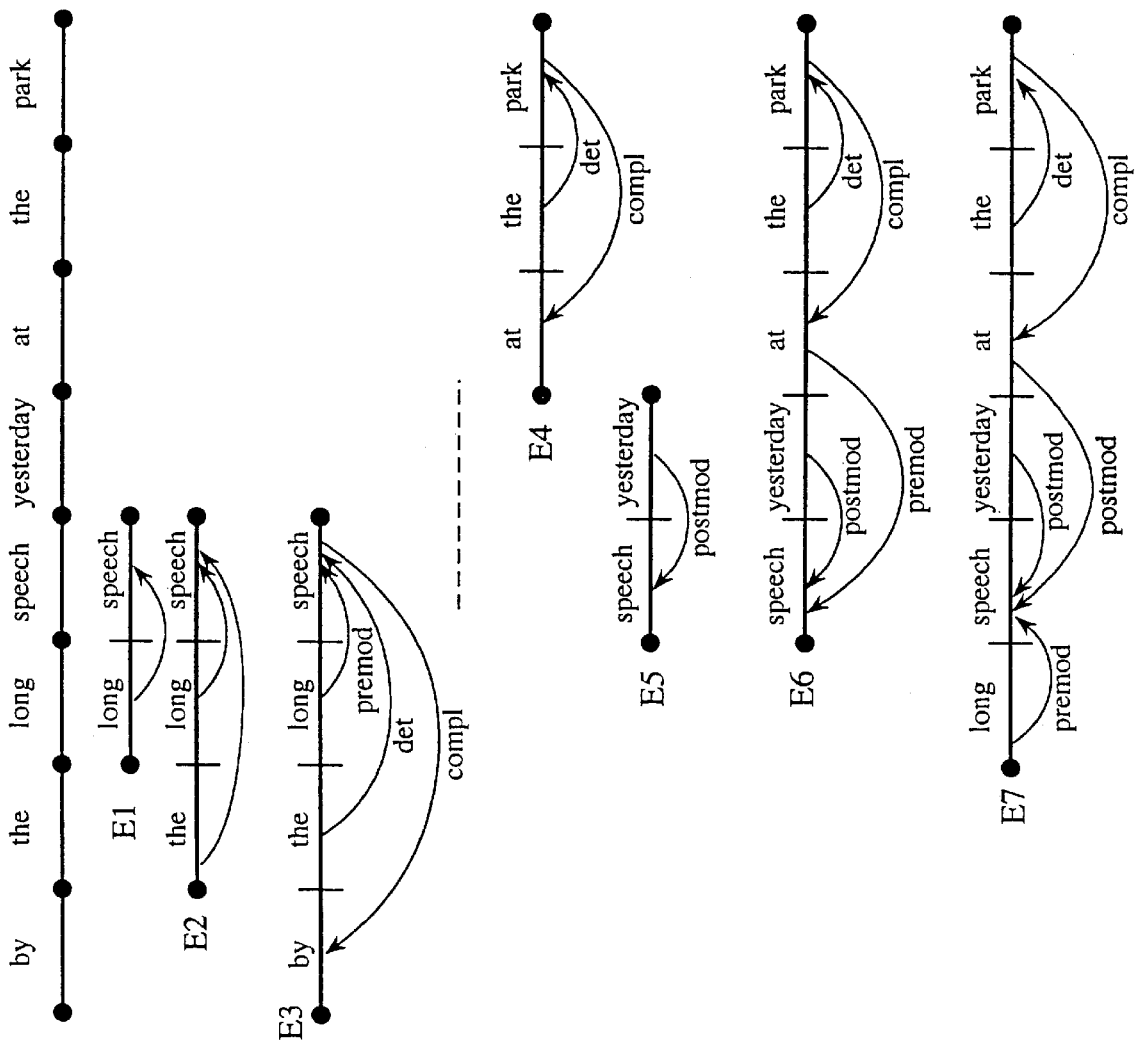
FIG. 25 is a diagram schematically showing an example of the first chart at intermediate stage.

FIG. 25 shows the contents of the first chart after the analysis proceeds further. In FIG. 25, for example, an edge E2 which is the target edge on the first chart is combined with the edge including the word "by", thus, a new edge E3 is prepared. This edge has the dependency structure in which the word "by" as a parent node and the word 'speech" as a child node are connected to each other with the "compl" relation. In this case, applying the grammar rule to the word "the" which corresponds to the word W3 has been finished.

Figure 29:
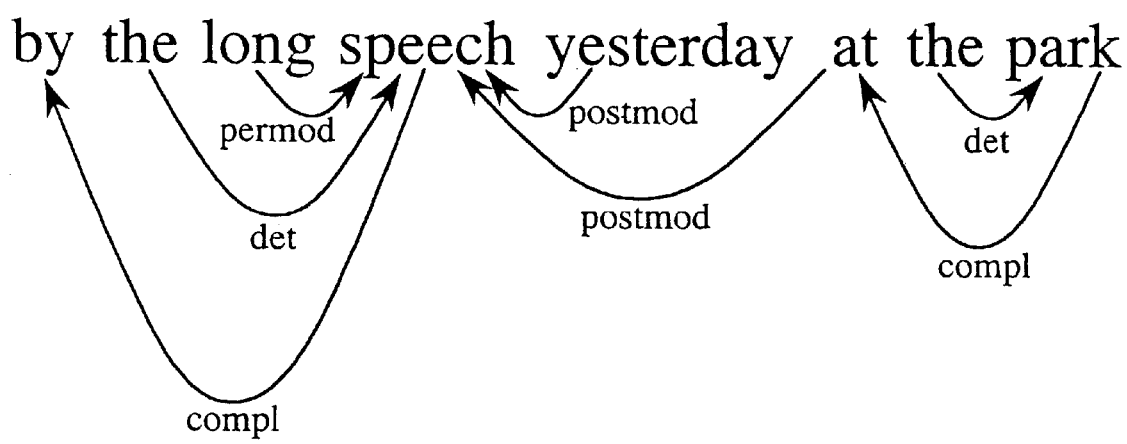
FIG. 29 is a diagram showing the result after analyzing the English sentence shown in FIG. 18.

An edge E6 shown in FIG. 25 is prepared by the first grammar applying section 61 by combining an edge E4 with an edge E5. When the edge E6 is selected as the target edge, the edge E6 is combined with an edge including "long" to prepare an edge E7. The edge E7 will never be combined with an edge "the" on the left of the edge E7, because each of the words at both ends of the edge E7 has already had all applicable dependency structures, therefore, there is no capability to connect those words to other words. The word "speech" in the middle of the edge still has ability to be connected to a definite article with the "det" relation, however, no further growth of the edge E7 will be found in the first chart because the connection of the words except the words at the ends of the edge with other words in other edges is restricted under the control of the first grammar applying section 61. Therefore, the edge E6 does not grow to the correct structure shown in FIG. 29.

Figure 26:
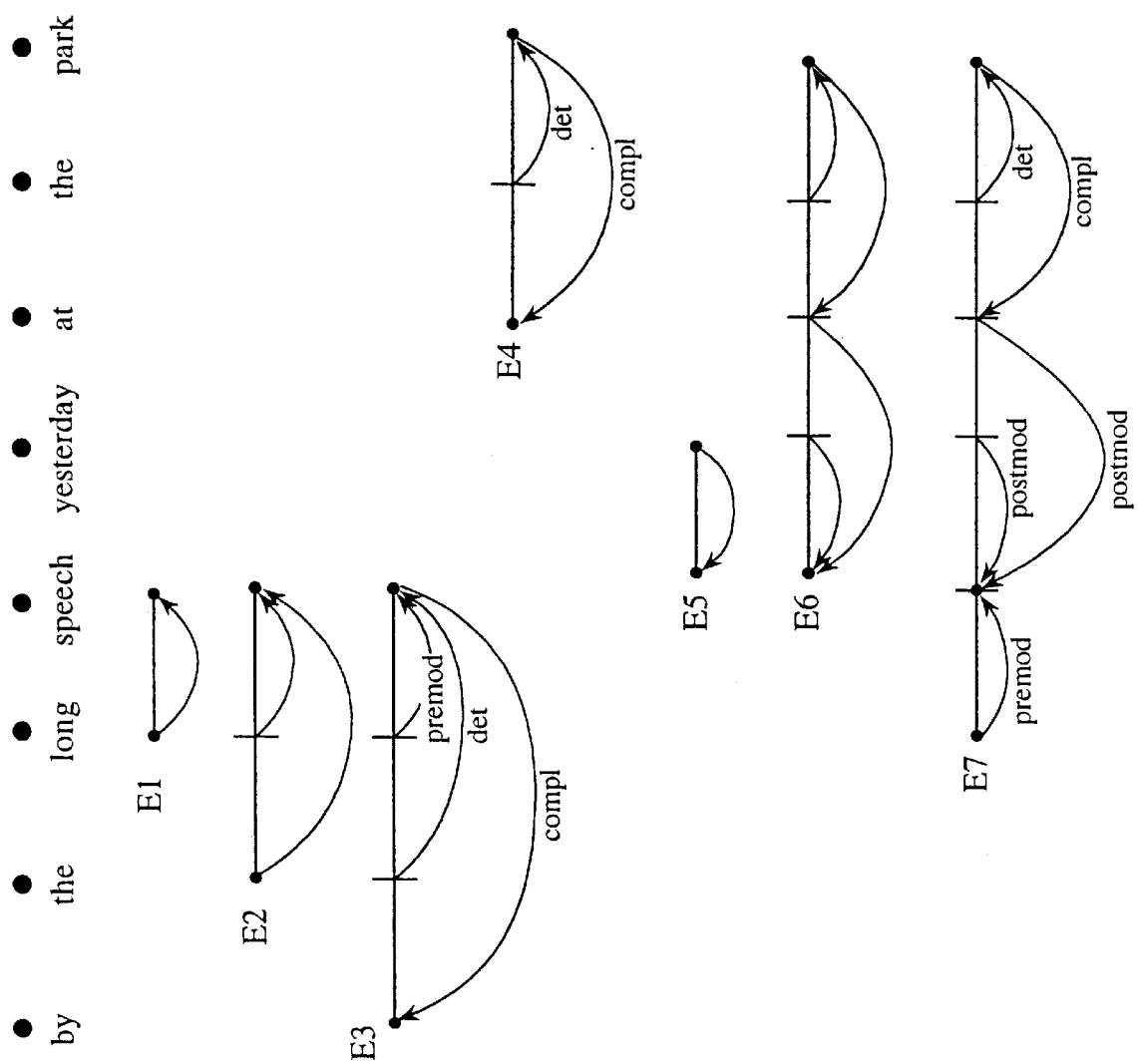
FIG. 26 is a diagram schematically showing an example of the second chart at intermediate stage.

FIG. 26 shows the contents of the second chart at the time when the first chart has the contents shown in FIG. 25. In FIGS. 25 and 26, the same reference numerals are given to the corresponding edges. When the edge E6 is selected as the target edge Er, the edge Er (2) corresponding to the target edge Er is an edge E6 shown in FIG. 26. The analysis control section 8 sequentially sends the edge E6 in the second chart shown in FIG. 26 and an edge on the left of the edge E6 to the second grammar applying section 62. The second grammar applying section 62 combines the two edges from the analysis control section 8 with each other, and checks the combined edge whether the connective dependency structure can be establish therein or not.

The analysis control section 8 sequentially selects the edges E1, E2 and E3 as edges aligned in the left side of the edge E6, then sends them as the edges El (2) and Er (2) to the second grammar applying section 62 together with the edge E6. The second grammar applying section 62 combines the dependency relations given to the common word "speech" in the former edges with each other, and checks whether applying the grammar rule to the word "speech" is regarded as a finished action or not. For example, the word "speech" was the parent node with the "premod" relation in the edge El, and was the parent node with two "postmod" relations in the edge E6. Because the existence of the plurality of "postmod" relations is allowed, the combined relations such as "premod relation to a right word, two postmod relations to left words, and being a parent node for all relations" has allowable coordination for the word "speech". Moreover, all essential relations are satisfied. Therefore, the coordination checking section 62c determines that the check is successful.

Under the above situation, the dependency structure creating section 62d creates the dependency structure in which the edges El and E6 are combined with each other, and sends the created dependency structure to the edge registering section 7. The edge registering section 7 registers the dependency structure from the dependency structure creating section 62d to the first and second charts as a new edge. Since the structure has completely the same sectional structure and the same situation of applying the grammar rule to the end words "long" and "speech" as those in the edge E7, the structure is packed with the edge E7 with the registering action both in the first and second charts.

Figure 27:
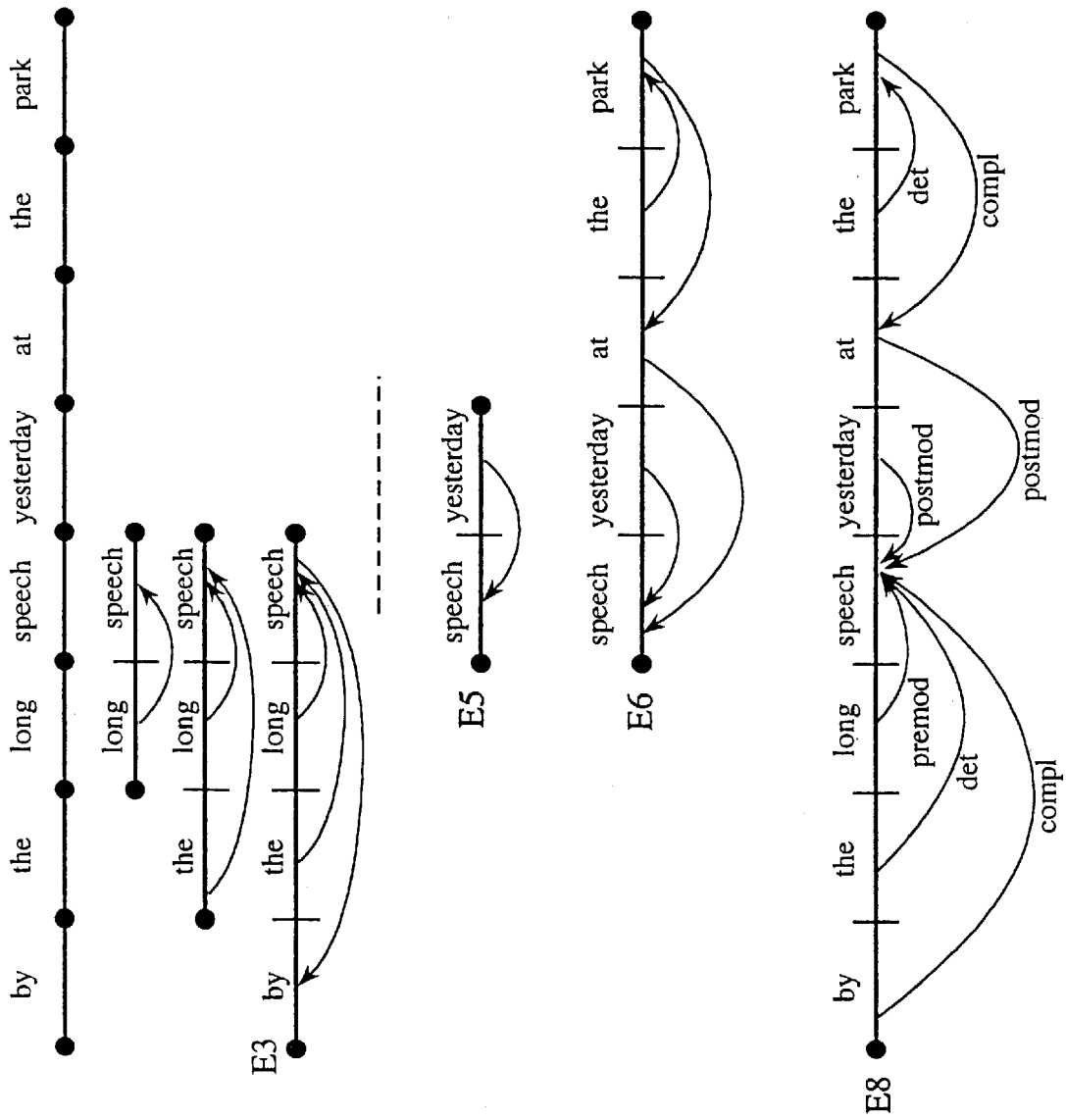
FIG. 27 is a diagram schematically showing an example of the first chart at intermediate stage.
Figure 28:
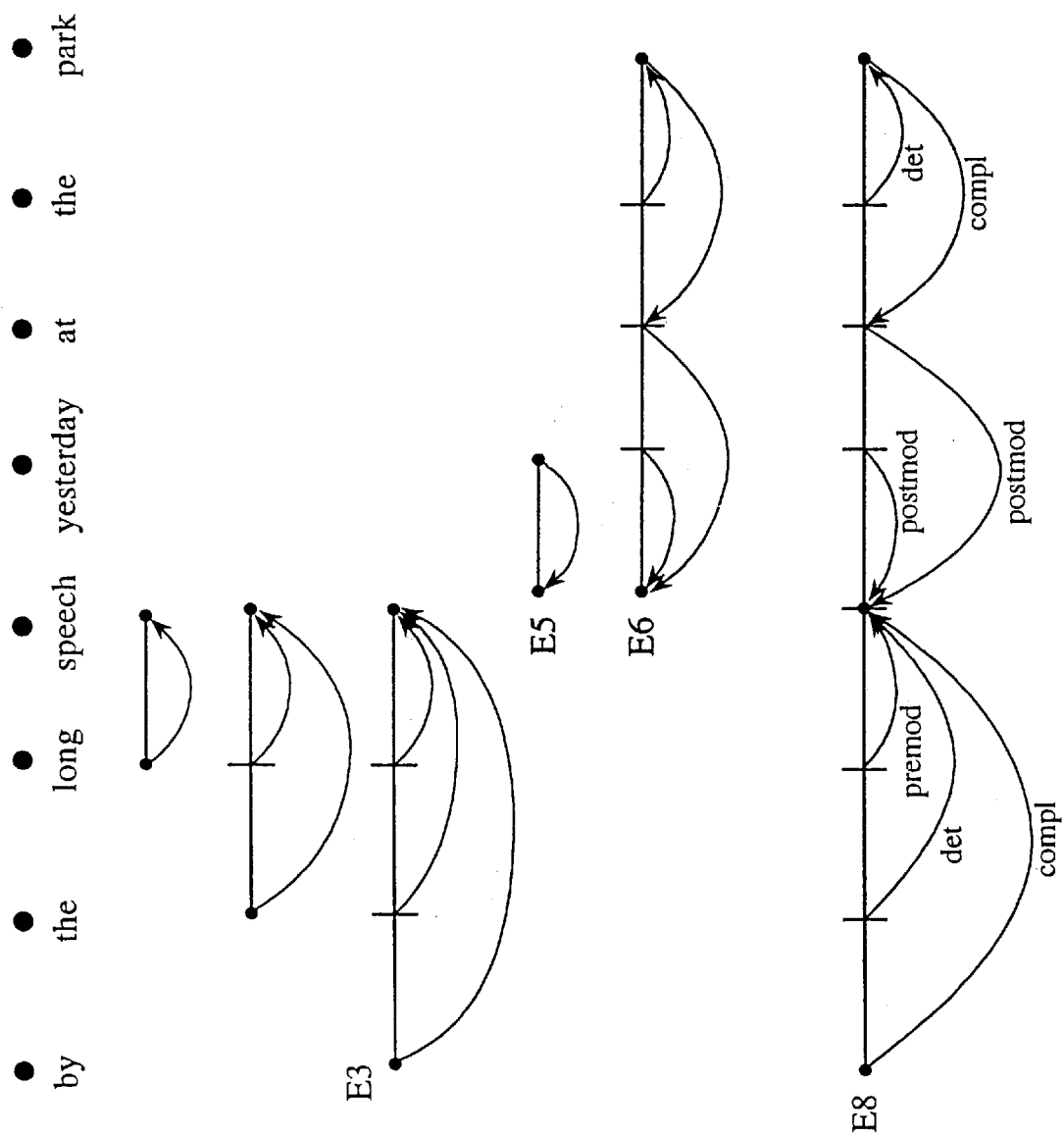
FIG. 28 is a diagram schematically showing an example of the second chart at intermediate stage.

In conclusion, an edge prepared by combining the edges E3 and E6 with each other will be a final edge. After those edges are sent to the second grammar applying section 62, a new dependency structure is prepared after the checking in the same manner for the case of the edge El. FIG. 27 shows the contents of the chart when thus prepared dependency structure is registered thereto as a new edge. FIG. 28 shows the contents of the second chart when the first chart has the contents shown in FIG. 27. As shown in FIGS. 27 and 28, a final edge E8 is obtained in the first and second charts.

Though the analysis control section 8 performs further analysis in the same manner, only the edge E8 contains the all words. When the analyses are completed, the analysis result selecting section 11 selects only the edge E8 as the final result. The output section 9 outputs the dependency structure shown in FIG. 29 as the final result.

Third Embodiment

Figure 30:
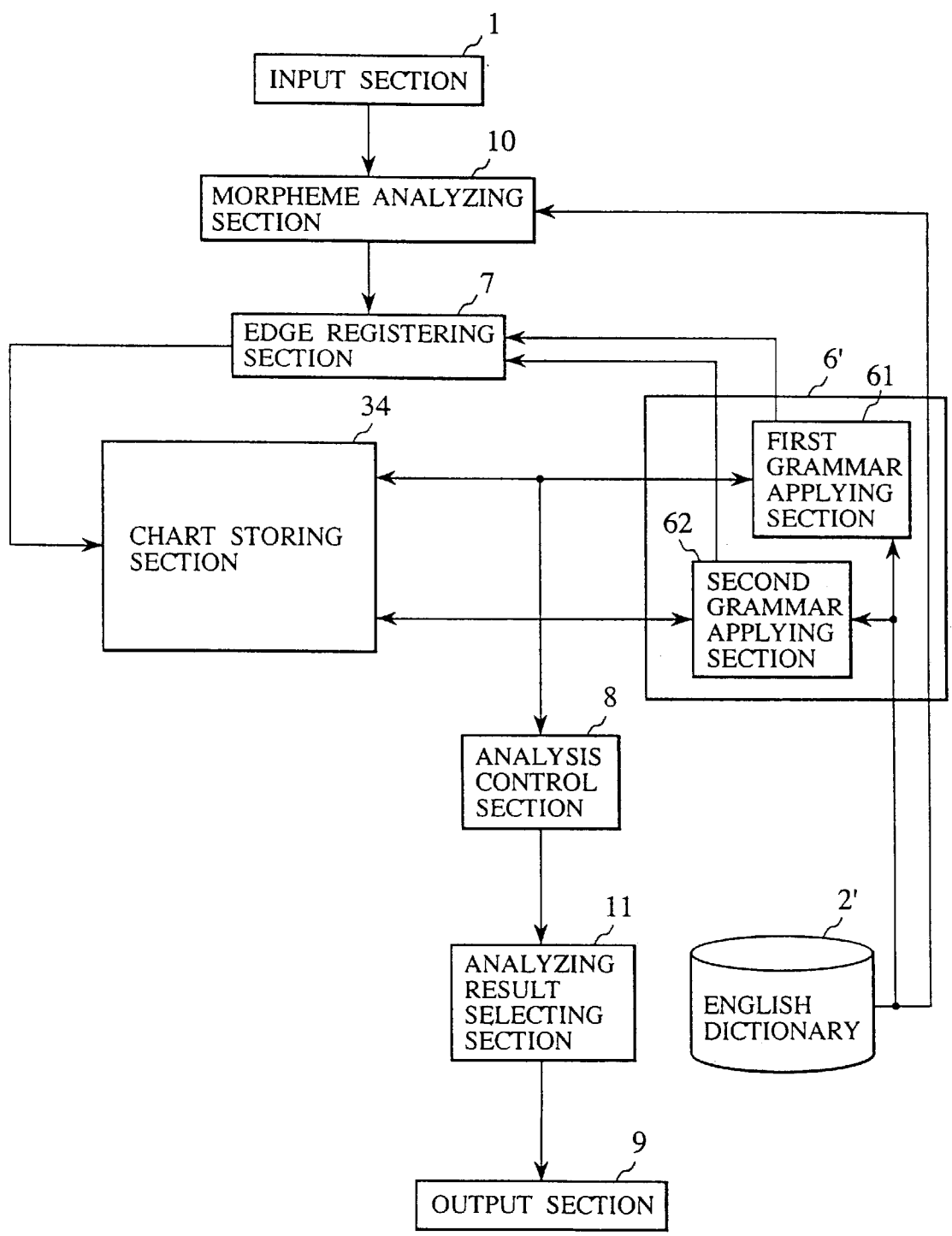
FIG. 30 is a block diagram showing the function structure of a natural language analyzing system according to a third embodiment of the present invention.

The third embodiment also provides a natural language analyzing system which analyzes English syntax. FIG. 30 is a block diagram illustrating the functional structure of the natural language analyzing system according to the third embodiment. This natural language analyzing system differs from that of the second embodiment in that the natural language analyzing system of the third embodiment has only one chart storing section 34 in place of the first and second chart storing sections 3 and 4, and does not have the correspondence management section 5. Furthermore, the functions of the first and second grammar applying section 61 and 62 according to the third embodiment also differ slightly from those of the second embodiment.

The chart storing section 34 stores a common chart comprising logical first and second charts which have been realized physically by a single structure. The common chart stored in the chart storing section 34 retains, as edges, local analyzing result showing the result of analyses of the dependency of each word on the other or others and the dependency relation between the words, with the locations of the words being nodes. The logical first and second charts are identical with those of second embodiment.

The reason the common chart having physically a single structure can be handled as two charts will now be explained. The contents of the first chart and those of the second chart are basically the same as each other. That is, the same edges are registered in the same locations in the first and second charts, except edges having length 1 which represents a word.

Referring to FIG. 25, for example, it can be understood therefrom that an edge E4 and an edge E5 are adjacent to each other on the first chart. However, referring to FIG. 26 which illustrates the second chart at the same point in time as FIG. 25, it can be understood that the edge E4 and the edge E5 are not adjacent to each other on the second chart. In contrast, an edge E3 and an edge E6 are not adjacent to each other on the first chart, however, they are adjacent to each other on the second chart.

Two edges which are adjacent to each other on the second chart share a word on the first chart at ends of the edges. The two edges which share the word on the first chart are adjacent to each other on the second chart. For example, the edge E3 and the edge E6 share the word "speech" on the first chart, and are adjacent to each other on the second chart. As seen from this, the state of two edges being adjacent to each other on the second chart and the state of the two edges sharing a word on the first chart are the same.

Thus, there is a systematic correspondence between the first and second charts. Hence, by varying the interpretation of the adjacent relation between edges depending on circumstances, the common chart into which the first and second charts have been physically combined can be handled as being logically two charts. More specifically, the analysis control section 8 regards the chart stored in the chart storing section 34 as the first chart when the adjacency of two edges are defined in terms of physical adjacency on the chart; two edges are considered adjacent if and only if they share one and only one node at the end of them, having no words in common. Meanwhile, the analysis control section 8 regards the chart as the second chart when the adjacency of two edges are defined in terms of unique shared word; two edges are considered adjacent if and only if there is one and only one word shared by both edges. In the latter case, the analysis control section 8 regards edges having length 1 as not being existent.

Figure 31:
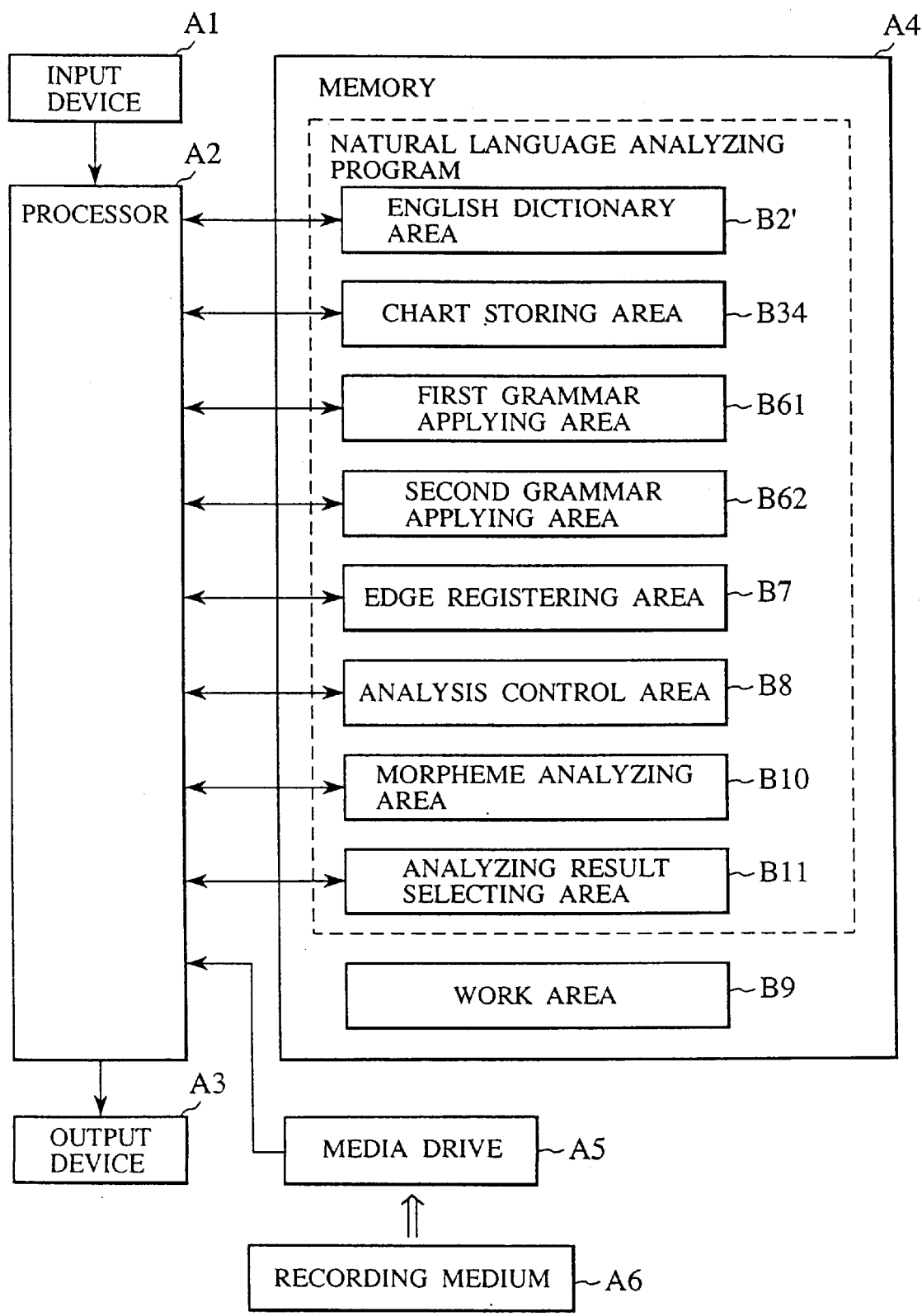
FIG. 31 is a block diagram showing the structure of a computer system which accomplishes the natural language analyzing system shown in FIG. 30.

FIG. 31 is a block diagram showing the structure of a computer system which realizes the natural language analyzing system illustrated in FIG. 30. As in the case of the second embodiment, this computer system has basically the same structure as that of the first embodiment which is illustrated in FIG. 2, except that the natural language analyzing program, loaded from the storage medium A6 into the storage device 2 in the third embodiment, differs from that of the first and second embodiments, and besides the areas allotted to the memory device A4 in the third embodiment differ from those of the first and second embodiments.

In the third embodiment, a single chart storing section B34 is allotted to the memory device A4, in place of the first chart storing area B3 and the second chart storing area B4. The chart storing area B34 is an area which stores a program for realizing the chart storing section 34 shown in FIG. 30. The processor A2 executes the program stored in the chart storing area B34, thereby realizing the function of the chart storing section 34.

Figure 32:
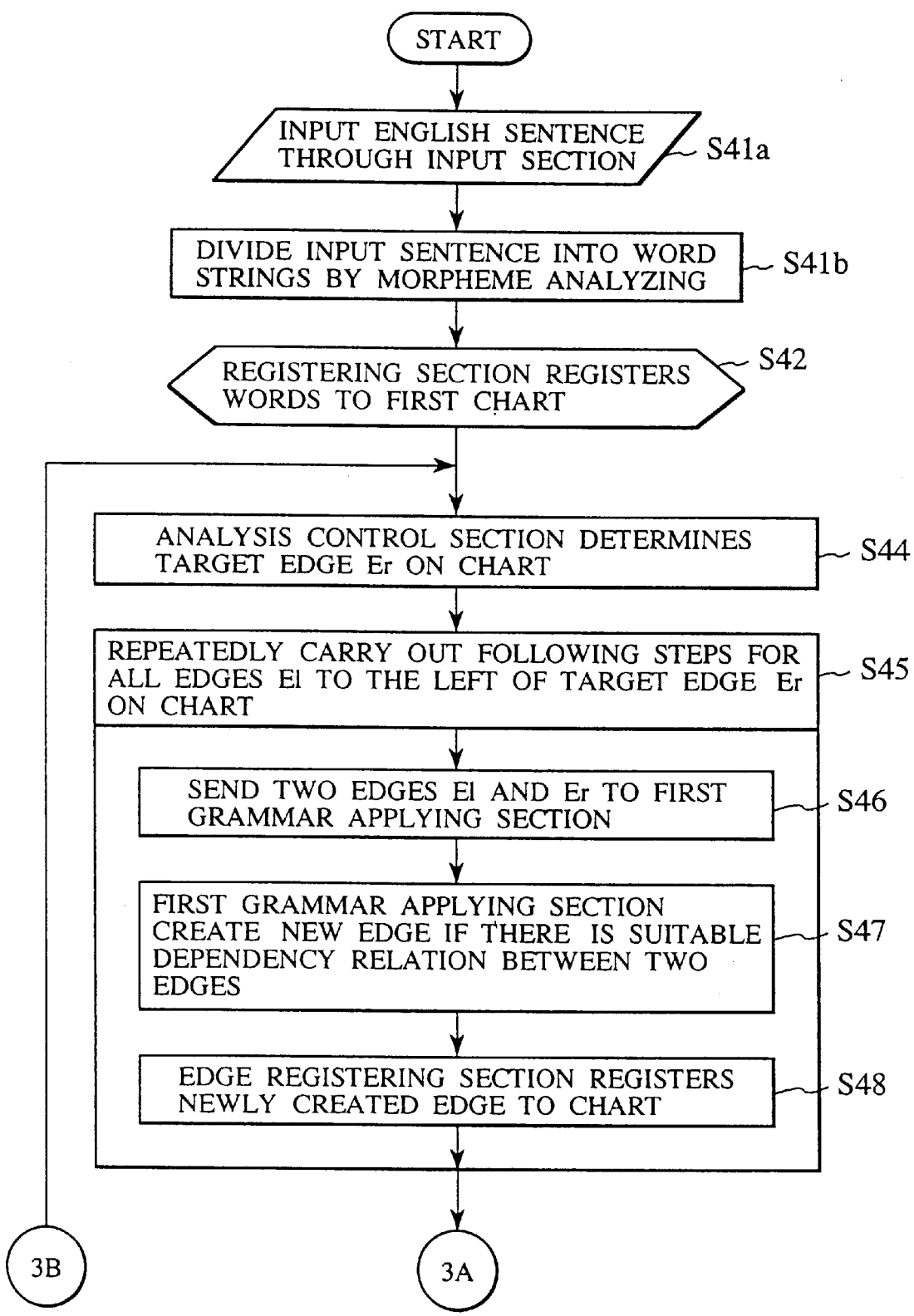
FIG. 32 is a flowchart showing the steps to be executed by the natural language analyzing system shown in FIG. 30.
Figure 33:
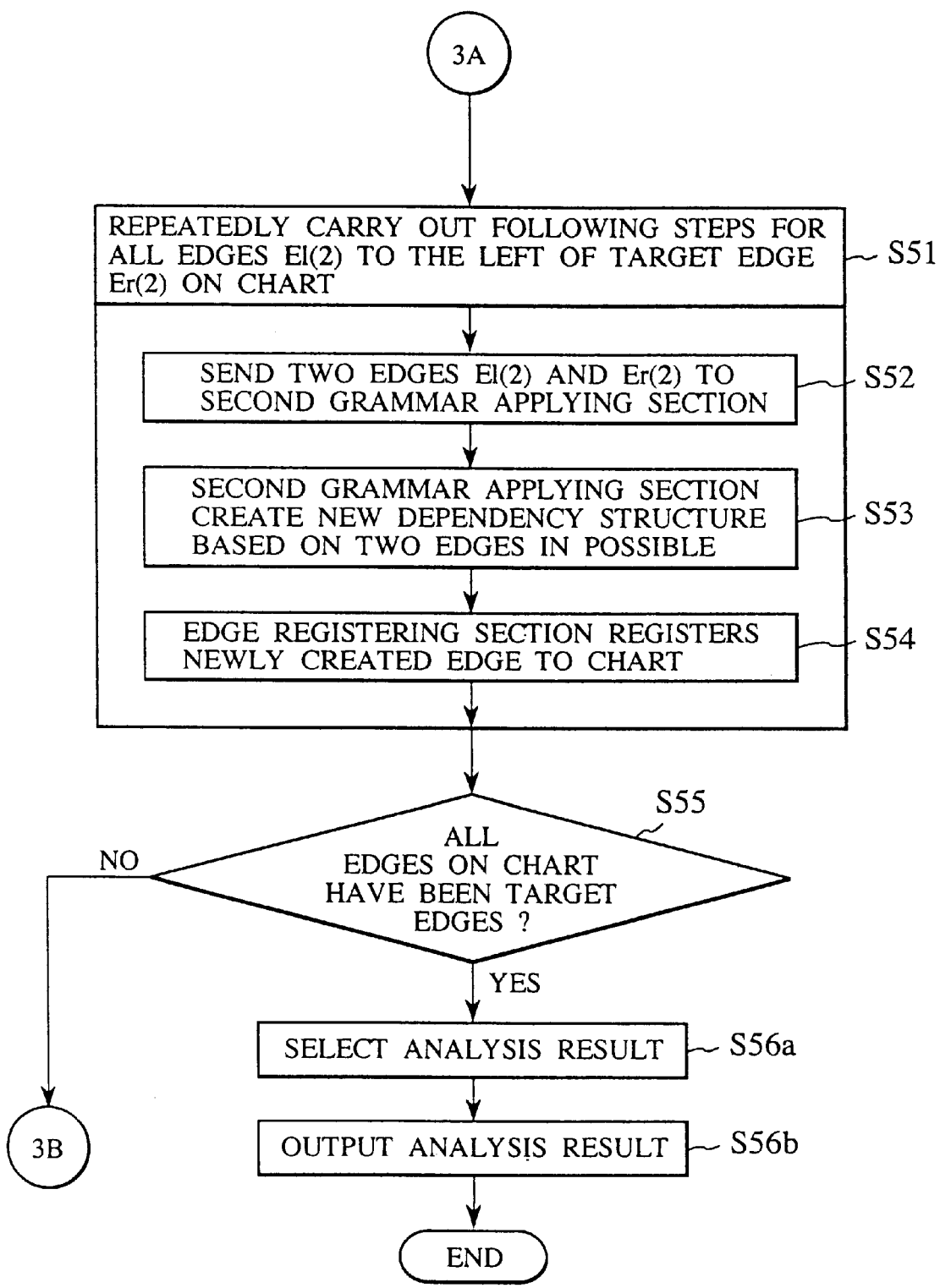
FIG. 33 is a flowchart showing the steps to be executed by the natural language analyzing system shown in FIG. 30.
Figure 34:
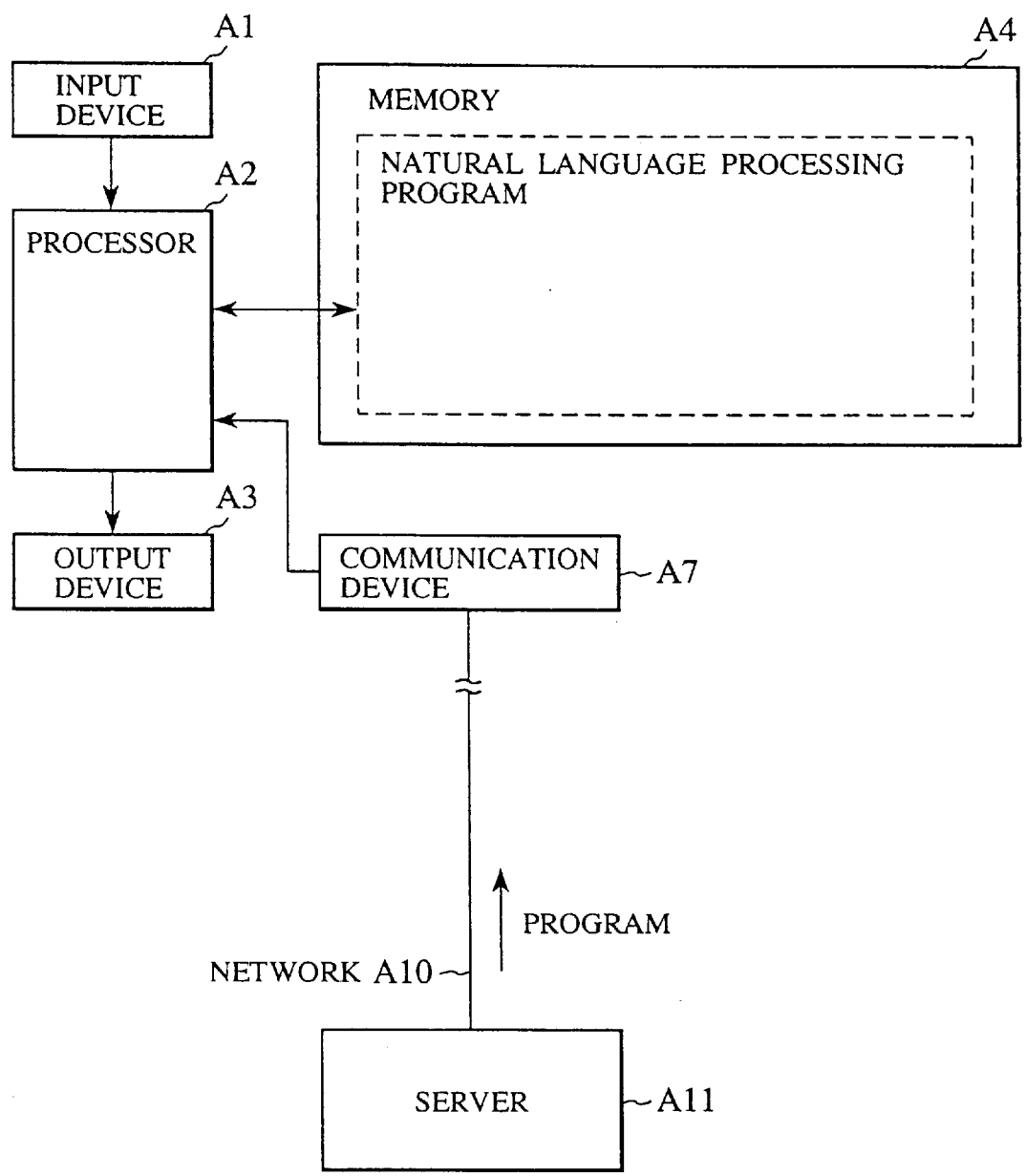
FIG. 34 is a block diagram showing another structure of a computer system which accomplishes the natural language analyzing system according to the first to third embodiment of the present invention.
Figures 37A, 37B, 37C, 37D:
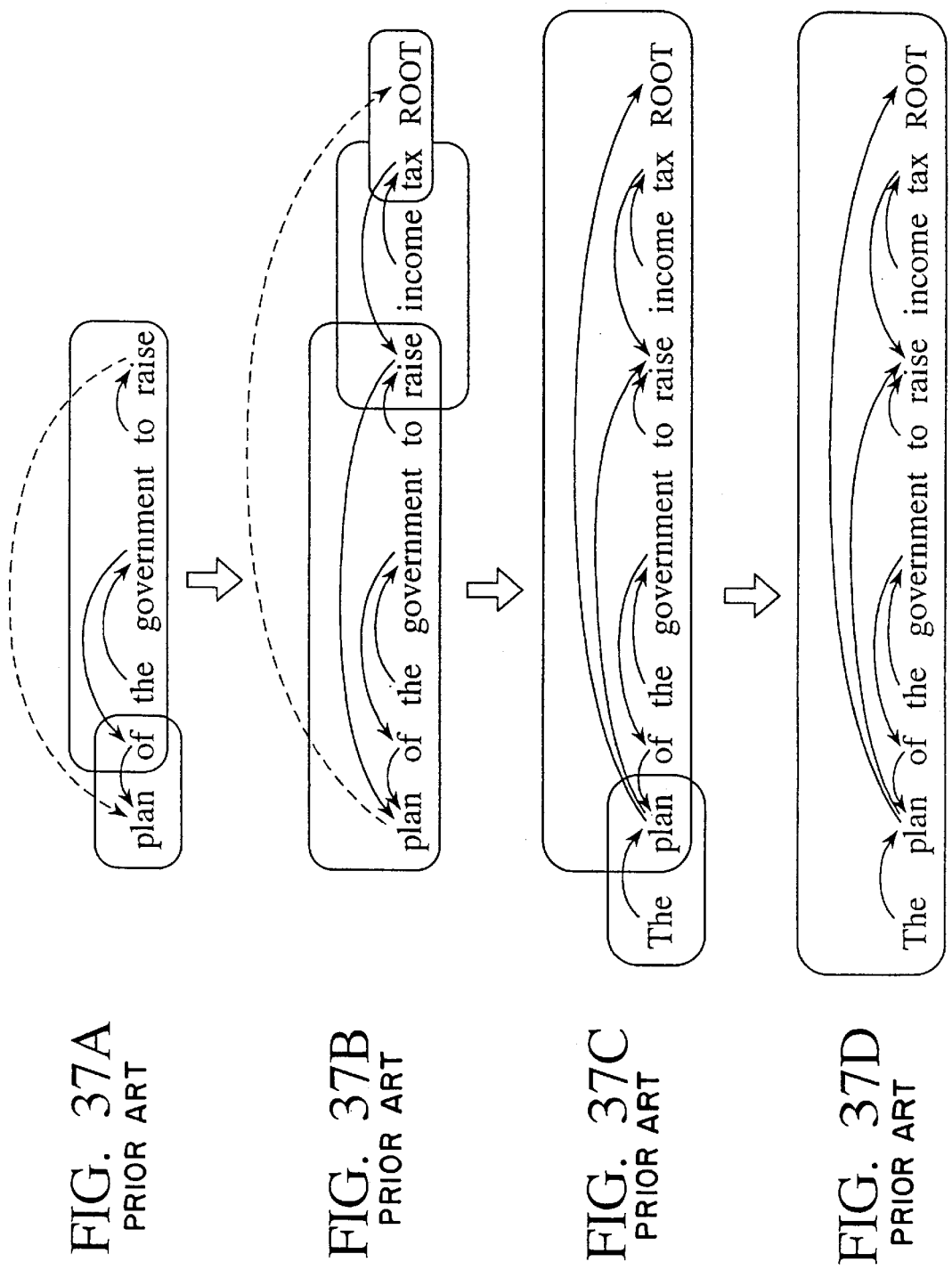
FIGS. 37A to 37D are diagrams showing context analyzing process according to the conventional technique.

The operation of the natural language analyzing system according to the third embodiment will now be explained with reference to the flowcharts of FIGS. 32 and 33. Explanations which will be made hereinafter in regard to the operation of the natural language analyzing system are based on the functional block diagram illustrated in FIG. 30.

The input section 1 inputs an English sentence to be analyzed (a step S41a). The input English sentence which has been input from the input section 1 is sent to the morpheme analyzing section 10. Morphemically analyzing the English sentence which has been input from the input section 1 with reference to the English dictionary 2', the morpheme analyzing section 10 divides the input English sentence into strings of two or more words (a step S41b).

The morpheme analyzing section 10 sends the divided strings of words to the edge registering section 7. The edge registering section 7 creates an initial chart which contains the words as edges, with the locations of the beginning and end of each string of words received from the morpheme analyzing section 10 and the locations between the words being nodes, after which the edge registering section 7 stores the created first chart in the first chart storing section 3 (a step S42).

After the initial chart has been thus created, the analysis control section 8 is activated to start so that the analysis control section 8, the first grammar applying section 61, the second grammar applying section 62 and the edge registering section 7 start the analysis of the syntax of the input English sentence. The analysis of the syntax is performed in accordance with the bottom-up method or the chart system which analyzes the sentence from left to right. The process of analyzing the syntax will be described below in detail:

The analysis control section 8 determines a target edge Er among the edges retained in the chart stored in the chart storing section 34 (a step S44). Then, the analysis control section 8 sequentially determines, as an edge El, adjacent edges which are located on the left side of the target edge Er on the logical first chart, and repeats steps S46 to S48 with respect to each of the determined edges (a step S45).

The analysis control section 8 sends the edge El and the target edge Er to the first grammar applying section 61 (a step S46). With reference to the English dictionary 2', the first grammar applying section 61c hecks whether there is any connective dependency relation between the words located at both ends of the two edges El and Er. In the case where there is the connective dependency relation between them, the first grammar applying section 61 produces local analyzing result in which the words located at both ends have been connected with each other by the connective dependency relation, and sends the produced result to the edge registering section 7 (a step S47).

Before thus newly generating the local analyzing result, the first grammar applying section 61 determines whether one of two conditions is satisfied. One condition is that all of words other than the words located at both ends of each of the local analyzing result to be newly generated be in the state of having undergone the application of the grammar rules. The other condition is that all of words other than the words located at both ends of each of the local analyzing result to be newly generated become such a state by being connected with each other by the dependency relation. In the case where neither of these conditions is satisfied, the first grammar applying section 61 does not generate the local analyzing result. The above-described conditions ensure the grammatical functions of the local analyzing result after generated being determined only by the words located at both ends of the edges. Therefore, by packing the local analyzing result with another edge as will be explained later, the natural language analyzing system of this embodiment can complete the analysis of the syntax of the input English sentence through calculations of an amount on the order of the third power of the number of words.

The local analyzing result produced by the step S47 are sent from the first grammar applying section 61 to the edge registering section 7. Having received the local analyzing result from the first grammar applying section 61, the edge registering section 7 registers the received result as an edge in the chart. However, in the case where a word located at one end of the newly prepared edge coincide with a word located at one end of the edge which has been already registered in the charts, and the newly prepared edge and the registered edge have the same grammatical function, the edge registering section 7 packs the newly prepared edge with the registered edge as representative edges so that a later application of the grammatical rules will be performed with only the representative edges being set as target edges (a step S48).

Having finished the above-described processing with respect to all edges located on the left side of the edge Er, the analysis control section 8 sequentially determines, as an edge El (2), adjacent edges located on the left side of an edge Er (2), which corresponds to the target edge Er, in the case where the chart is adopted as the logical second chart, and repeats steps 52 to S54 with respect to each of the determined edges (a step S51).

The analysis control section 8 sends the edge El (2) and the edge Er (2) to the second grammar applying section 62 (a step S52). With reference to the dependency grammar rules stored in the English dictionary 2', the second grammar applying section 62 checks whether the edges located at both ends of the two edges El (2) and Er (2) can be connected with each other by the connective dependency relation. In the case where they can be connected with each other by the connective dependency relation, then the second grammar applying section 62 produces local analyzing result in which the words located at both ends have been connected with each other by the connective dependency relation, and sends the produced result to the edge registering section 7 (a step S53).

At that point, the second grammar applying section 62, as well as the first grammar applying section 61, checks whether one of two conditions is satisfied.

One condition is that all of words other than the words located at both ends of each of the local analyzing result to be newly generated be in the state of having undergone the application of the grammar rules. The other condition is that all of words other than the words located at both ends of each of the local analyzing result to be newly generated become such a state by being connected with each other by the dependency relation. In the case where neither of these conditions is satisfied, the second grammar applying section 62 does not generate the local analyzing result.

The edge registering section 7 receives the local analyzing result from the second grammar applying section 62, and registers it as an edge in the chart stored in the chart storing sections 34 (a step S54). In this case, the edge registering section 7 packs the edges if necessary, as in the case of the second chart.

Having completed processing with respect to all possible edges El (2), the analysis control section 8 again make a reference to the chart and determines whether any edge to be dealt with the target edge remains on the chart (a step S55). In the case where the analysis control section 8 determines in the step S55 that such an edge remains on the chart, the analysis control section 8 returns to the step S44, determines the next target edge Er and repeats the steps following the step S44.

In the case where the analysis control section 8 determines in the step S55 that such an edge does not remain on the chart, the analyzing result selecting section 11 is activated. The analyzing result selecting section 11 gains access through the analysis control section 8 to the chart stored in the chart storing section 34, and acquires an edge established throughout the chart and which is appropriate as the analyzing result, thus selecting the appropriate analyzing result (a step S56a). The analyzing result selecting section 11 passes the selected edges to the output section 9. The output section outputs the edges received from the analyzing result selecting section 11 as the analyzing result (a step S56b).

The case where the edge E6 shown in FIG. 25 is the target edge Er will now be specifically explained as an example. The first grammar applying section 61 creates an edge E7 as a result of connecting, by the dependency relation, an edge E6 and an adjacent edge (the word "long") which is located on the left side of the edge E6 in the case where the chart is adopted as the logical first chart. The second grammar applying section 62 creates an edge E8 as a result of connecting, by the dependency relation, the edge E7 and adjacent edges El, E2 and E3 which are located on the left side of the edge E7 in the case where the chart is adopted as the logical second chart. The edge E8 is output from the output section 9 as the result of the analysis.

According to the natural language analyzing system of the third embodiment, the first and second charts are realized by a chart having physically a single structure. Because of this, the capacity of the chart storing area B34 which realizes the chart storing section 34 is smaller than the sum of the capacities of the first and second chart storing areas B3 and B4 explained in the second embodiment. Accordingly, the capacity of the memory device A4 which is required for processing in the natural language analyzing system of the third embodiment is smaller than in the case of the second embodiment.

Modifications of Embodiments

In the third embodiment described above, the chart storing section 34 stores a chart which has physically the same structure as the first chart stored in the first chart storing section 3 (the first storing area B3) of the second embodiment. However, the chart storing section 34 may store a chart which has physically the same structure as the second chart of the second embodiment, and the chart stored in the chart storing section 34 may be interpreted as a chart having logically two structures.

In the first to third embodiments described above, no restricting conditions are imposed on the grammar applying section 6 (the first and second grammar applying sections 61 and 62) when connecting edges together by the dependency relation. This entails the possibility of the same part of a sentence being analyzed by two or more procedures, unnecessarily lengthening processing. In consideration of this, a restricting condition that an edge located on the left or right side of the target edge be one which does not have an internal structure, can be imposed on the grammar applying section 6 (the first and second grammar applying sections 61 and 62) when connecting edges together by the dependency relation.

In the first to third embodiments explained above, the bottom-up method or the chart which analyses a sentence from left to right is adopted to analyze syntax. However, a top-down system, a chart system which analyzes a sentence from right to left, or an island drive system may be adopted in order to analyze syntax in the present invention. Alternatively, a combination of those methods may be adopted to analyze syntax.

The natural language analyzing system according to each of the above-described first to third embodiments is realized on a stand-alone computer system. However, a string of words to be analyzed may be input from a terminal connected to a network, and the result of the analysis may be returned to the terminal. In this case, a communications device which exchanges data with the terminal through the network functions as both the input device A1 and the output device A3.

In the above-described first to third embodiments, the grammar dictionary 2 or the English dictionary 2' is also contained in the natural language analyzing program, and the medium driver A5 reads out the dictionary 2 or 2' contained in the natural language analyzing program from the storage medium A6, and stores the read-out dictionary in the memory device A4. However, dictionaries adopted in a conventional system can be adopted as they are in the present invention, and therefore the program which is read out from the storage medium A6 and supplied to the memory device A4 may not contain the dictionary 2 or 2' recorded therein.

In the above-described first to third embodiments, the medium driver A5 reads out the natural language analyzing program from the storage medium A6, and stores the read-out program in the memory device A4. However, as shown in FIG. 35, such a program may be distributed in the state of being embedded in a carrier wave from a server A11 through a network A10, and a communications device A7 may receive the program and stores it in the memory device A4.

The present invention can be embodied in any other form, without departing from the sprit and scope thereof. The above-described embodiments are referred to only for explanation and does not limit the present invention. The scope of the present invention is shown by the attached claims rather than the explanations presented above. All modifications made within the meaning of an equivalent of the claims and the range of the claims are to be regarded as being within the scope of the present invention.

This application is based on Japanese Patent Application No. H10-228850 filed on Aug. 13, 1998, and including specification, claims, drawings and summary. The disclosure of the above Japanese Patent Application is incorporated herein by reference in its entirety.

What is claimed is:

1. A natural language analyzing system for analyzing natural language, comprising a processor which processes data by executing a program in accordance with input data, a memory connected to said processor and in which the program to be executed by said processor and data necessary for execution of the program are stored, an input device connected to said processor and which inputs data to said processor, and an output device which outputs data processed by said processor, wherein said memory contains a dictionary storing area which stores rules of a dependency grammar of the natural language, a chart storing area storing a first chart which retains a dependency structure as an edge in which words are connected with each other with connective dependency relation while regarding positions at intervals among the words in a word string to be analyzed as nodes, and a second chart which retains a dependency structure as an edge in which words are connected with each other with the connective dependency relation while regarding the words in the word string to be analyzed as the nodes;

a grammar applying area which stores a program for creating a dependency structure connecting an adjacent pair of edges on said first chart and a dependency structure connecting an adjacent pair of edges on said second chart, by applying the rules of the dependency grammar stored in said dictionary storing area to the adjacent pair of edges on said first chart and the adjacent pair of edges on said second charts, an edge registering area which stores a program for storing, in said chart storing area, the dependency structure created by the program stored in said grammar applying area, as new edges to be retained in said first and second charts, and an analysis control area which stores a program for repeating creation of the dependency structure which is performed by the program stored in said grammar applying area and storage of the new edges which is performed by the program stored in said edge registering area, until a predetermined condition is satisfied;

said input device inputs the string of words to be analyzed;

said processor analyzes the string of words which has been input from said input device, by executing the program stored in said analysis control area and thereby sequentially executing the program stored in said edge registering area and the program stored in said grammar applying area until the predetermined condition is satisfied; and said output device outputs, as a result of analysis of the string of words which has been input from said input device, the edges stored in said first chart when the predetermined condition has been satisfied.

2. The natural language analyzing system according to claim 1, wherein when the string of words to be analyzed is input from said input device, the program stored in said edge registering area generates an initial first chart in which the locations between the words included in the input string of words are nodes while the words are edges, generates an initial second chart containing no edges and in which the words included in the input string of words are nodes, and stores the initial first and second charts in said chart storing area.

3. The natural language analyzing system according to claim 1, wherein:

the program stored in said analysis control area determines a target edge among the edges retained in said first chart stored in said chart storing area and a target edge among the edges retained in said second chart stored in said chart storing area; and said grammar applying area stores a first grammar applying program for generating a new edge by applying the rules of the dependency grammar stored in said dictionary storing area to the determined target edge and an adjacent edge on said first chart, and a second grammar applying program for generating a new edge by applying rules of the dependency grammar stored in said dictionary storing area to the determined target edge and an adjacent edge on said second chart.

4. The natural language analyzing system according to claim 3, wherein:

said memory further contains a correspondence management area which manages correspondence between the first and second charts stored in said chart storing area; and the program stored in said analysis control area determines a target edge among the edges retained in said first chart stored in said chart storing area, based on a dynamic programming scheme, and determines an edge, which corresponds to the target edge in the first chart, managed by said correspondence management area as another target edge.

5. The natural language analyzing system according to claim 3, wherein said first grammar applying program checks whether there is a dependency relation, conforming to the rules of the dependency grammar stored in said dictionary storing area, between the target edge determined on said first chart by the program stored in said analysis control area and an adjacent edge located on one of right and left sides of said target edge, and generates, out of said target edge and said adjacent edge, a new edge to be retained in said first chart when there is the dependency relation between said target edge and said adjacent edge.

6. The natural language analyzing system according to claim 1, wherein the predetermined condition for terminating the creation of the dependency structures performed by the program stored in said grammar applying area and the storage of the new edges performed by the program stored in said edge registering area is that all edges retained in said first chart stored in said chart storing area have been processed as target edges.

7. The natural language analyzing system according to claim 1, wherein:

said memory further contains a morpheme analyzing area which stores a program for morphemically analyzing the string of words to be analyzed which has been input from said input device;

said input device inputs a sentence written in the natural language and containing the string of words to be analyzed; and said processor morphemically analyzes the sentence which has been input from said input device and divides the sentence into strings of words by executing the program stored in said morpheme analyzing area, and generates, out of the divided strings of words, said initial first and second charts to be stored in said chart storing section.

8. The natural language analyzing system according to claim 1, wherein:

said memory further contains an analyzing result selecting area which stores a program for selecting edges to be output as the result of analysis, from among the edges stored in said first chart when the predetermined condition has been satisfied;

said processor executes the program stored in said analyzing result selecting section, thereby selecting the edges to be output as the result of analysis; and said output device outputs, as the result of analysis, the edges which said processing unit has selected by executing the program stored in said analyzing result selecting area.

9. The natural language analyzing system according to claim 1, wherein said chart storing area stores a single chart which has physically a single structure and which comprises logically two, first and second charts.

10. The natural language analyzing system according to claim 3, wherein said second grammar applying program checks whether there is a consistency between the target edge determined on said second chart by the program stored in said analysis control area and an adjacent edge located on one of right and left sides of said target edge, and generates, out of said target edge and said adjacent edge, a new edge to be retained in said first chart and said second chart by the application of said edge storing program in said edge registering area, when consistency is confirmed by coordination checking between said target edge and said adjacent edge.

11. A natural language analyzing system for analyzing natural language, comprising:

input means for inputting a string of words to be analyzed;

dictionary storing means for storing rules of dependency grammar of the natural language;

chart storing means for storing a first chart which retains a dependency structure as an edge in which words are connected with each other with connective dependency relation while regarding positions at intervals among the words in a word string to be analyzed as nodes, and a second chart which retains a dependency structure as an edge in which words are connected with each other with the connective dependency relation while regarding the words in the word string to be analyzed as the nodes;

grammar applying means for creating a dependency structure connecting an adjacent pair of edges on said first chart and a dependency structure connecting an adjacent pair of edges on said second chart, by applying the rules of the dependency grammar stored in said dictionary storing area to the adjacent pair of edges on said first chart and the adjacent pair of edges on said second charts;

edge registering means for storing, in both said first chart and said second chart, the dependency structures created by said grammar applying means as new edges;

analysis control means for controlling said grammar applying means to repeat creation of the dependency structures and controlling said edge registering means to repeat storage of the new edges until a predetermined condition is satisfied; and output means for outputting as a result of analysis the edges stored in said first chart, when the predetermined condition has been satisfied as a consequence of said analysis control means repeating the creation of the dependency structures and said edge registering means repeating the storage of the new edges.

12. The natural language analyzing system according to claim 11, wherein when the string of words to be analyzed is input from said input means, said edge registering means generates an initial first chart in which the locations between the words included in the input string of words are nodes while the words are edges, generates an initial second chart containing no edges and in which the words included in the input string of words are nodes, and stores the initial first and second charts in said chart storing means.

13. The natural language analyzing system according to claim 11, wherein:

said analysis control means determines a target edge among the edges retained in said first chart stored in said chart storing means and a target edge among the edges retained in said second chart stored in said chart storing means; and said grammar applying area includes means for generating a new edge by applying the rules of the dependency grammar stored in said dictionary storing area to the determined target edge and an adjacent edge on said first chart, and means for generating a new edge by applying rules of the dependency grammar stored in said dictionary storing area to the determined target edge and an adjacent edge on said second chart.

14. A natural language analyzing method for analyzing natural language, comprising:

inputting a string of words to be analyzed;

generating, at a time of input of the string of words to be analyzed, a first chart in which the locations between the words included in the input string of words are nodes while the words are registered as edges at the beginning of generation, and a second chart in which the words included in the input string of words are nodes and containing no edges at the beginning of generation, and storing the first chart and the second chart in a memory;

creating a dependency structure connecting an adjacent pair of edges on the first chart stored in the memory and a dependency structure connecting an adjacent pair of edges on the second chart stored in the memory, by applying pre-stored rules of a dependency grammar to the adjacent pair of edges on the first chart and the adjacent pair of edges on the second charts;

storing the created dependency structures as new edges in the first chart and the second chart in the memory;

repeating said creating of the dependency structures and said storing of the new edges until a predetermined condition is satisfied; and outputting, as a result of analysis, the edges stored in the memory when the predetermined condition has been satisfied as a consequence of repeating the creation of the dependency structures and the storage of the new edges.

15. The natural language analyzing method according to claim 14, wherein:

a target edge among the edges retained in said first chart stored in said memory and a target edge among the edges retained in said second chart stored in said memory are determined until the predetermined condition is satisfied; and said applying of the pre-stored rules is performed by applying the pre-stored rules of the dependency grammar to the determined target edge and an adjacent edge on the first chart and by applying the pre-stored rules of the dependency grammar to the determined target edge and an adjacent edge on the second chart.

16. The natural language analyzing method according to claim 14, wherein:

said inputting of the string of words to be analyzed is performed by inputting a sentence written in the natural language and containing the string of words to be analyzed;

said method further comprises morphemically analyzing and dividing the input sentence into strings of words, after said step of inputting the string of words; and an initial first chart in which locations between words included in each of the divided strings of words are nodes while the words are edges, and an initial second chart containing no edges and in which the words included in each of the divided strings of words are nodes, are generated as the initial first and second charts by said generating.

17. The natural language analyzing method according to claim 14, further comprising selecting edges to be output as the result of analysis from among the edges stored in the memory when the predetermined condition has been satisfied before said step of outputting the result of analysis, wherein the selected edges are output by said outputting as the result of analysis.

18. The natural language analyzing method according to claim 14, wherein the predetermined condition for terminating said creating of the dependency structures and said storing of the new edges is that all edges retained in said first chart have been processed as target edges.

19. A computer program product, including a computer usable medium having a computer readable program embodied therein for executing:

a first edge registering step of generating, at a time of input of a string of words to be analyzed, a first chart in which locations between the words included in the input string of words are nodes while the words are registered as edges at the beginning of generation and a second chart in which the words included in the input string of words are nodes, and storing the first chart and the second chart in a memory;

a grammar applying step of creating a dependency structure connecting an adjacent pair of edges on the first chart stored in the memory and a dependency structure connecting an adjacent pair of edges on the second chart stored in said memory, by applying rules of a dependency grammar to the adjacent pair of edges on the first chart and the adjacent pair of edges on the second charts;

a second edge registering step of storing the dependency structures created by said grammar applying step as new edges in the first chart and the second chart in the memory; and an analysis control step of repeating said creating of the dependency structures and said storing of the new edges until a predetermined condition is satisfied.

20. A program data signal embedded in a carrier wave, comprising:

a first edge registering segment of generating, at a time of input of a string of words to be analyzed, a first chart in which locations between the words included in the input string of words are nodes while the words are registered as edges at the beginning of generation and a second chart in which the words included in the input string of words are nodes, and storing the first chart and the second chart in a memory;

a grammar applying segment of creating a dependency structure connecting an adjacent pair of edges on the first chart stored in the memory and a dependency structure connecting an adjacent pair of edges on the second chart stored in the memory, by applying pre-stored rules of a dependency grammar to the adjacent pair of edges on the first chart and the adjacent pair of edges on the second charts;

a second edge registering segment of storing the dependency structures created by said grammar applying segment as new edges in the first chart and the second chart in the memory; and an analysis control segment of repeating said creating of the dependency structures and said storing of the new edges until a predetermined condition is satisfied.

* * * * *